United States Patent
Nakagawa

(10) Patent No.: US 10,015,114 B2
(45) Date of Patent: Jul. 3, 2018

(54) INFORMATION PROCESSING SYSTEM, CONTROL DEVICE AND CONTROL METHOD

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 293 days.

(21) Appl. No.: 14/825,440

(22) Filed: Aug. 13, 2015

(65) Prior Publication Data
US 2016/0105377 A1    Apr. 14, 2016

(30) Foreign Application Priority Data

Oct. 14, 2014 (JP) .................... 2014-210175

(51) Int. Cl.
| | | |
|---|---|---|
| *H04L 12/741* | (2013.01) | |
| *H04L 12/801* | (2013.01) | |
| *H04L 12/743* | (2013.01) | |
| *H04L 12/937* | (2013.01) | |
| *H04L 29/06* | (2006.01) | |
| *H04L 12/935* | (2013.01) | |
| *H04L 12/931* | (2013.01) | |

(52) U.S. Cl.
CPC ........ *H04L 49/253* (2013.01); *H04L 49/3009* (2013.01); *H04L 49/50* (2013.01); *H04L 69/22* (2013.01)

(58) Field of Classification Search
CPC ............................... H04L 49/00; H04L 69/00
See application file for complete search history.

(56) References Cited

U.S. PATENT DOCUMENTS

| | | | | |
|---|---|---|---|---|
| 2005/0080923 A1* | 4/2005 | Elzur | ...................... | H04L 47/10 709/238 |
| 2009/0252036 A1* | 10/2009 | Fong | ....................... | H04L 45/00 370/231 |
| 2010/0215042 A1* | 8/2010 | Sato | ...................... | H04L 12/413 370/392 |

(Continued)

FOREIGN PATENT DOCUMENTS

JP         2004-254132         9/2004

*Primary Examiner* — Alpus H Hsu
*Assistant Examiner* — Camquyen Thai
(74) *Attorney, Agent, or Firm* — Staas & Halsey LLP

(57) ABSTRACT

An information processing system includes a switch device including a plurality of ports; and a control device configured to: specify a flow in which a transmission port is to be changed among the plurality of flows, and a transmission port after the change, by referring to load distribution information that associates flow information and port information with each other and statistics information indicating use rates of the ports, and transmit a changing instruction packet including information of the specified flow and the port after the change, for instructing the switch device to change the transmission port to the switch device, wherein the switch device is configured to update information in header information, which each of the series of packets included in the specified flow includes, so as to become information with which the port after the change is selected, when the changing instruction packet is received from the control device.

11 Claims, 23 Drawing Sheets

(56) References Cited

U.S. PATENT DOCUMENTS

| | | | |
|---|---|---|---|
| 2011/0090789 A1* | 4/2011 | Fung | H04L 41/5025 |
| | | | 370/230 |
| 2012/0263048 A1* | 10/2012 | Chen | H04L 47/125 |
| | | | 370/252 |
| 2012/0287791 A1* | 11/2012 | Xi | H04L 43/0882 |
| | | | 370/237 |
| 2014/0301226 A1* | 10/2014 | Choi | H04L 41/145 |
| | | | 370/252 |

* cited by examiner

INFORMATION PROCESSING SYSTEM, CONTROL DEVICE AND CONTROL METHOD

CROSS-REFERENCE TO RELATED APPLICATION

This application is based upon and claims the benefit of priority of the prior Japanese Patent Application No. 2014-210175, filed on Oct. 14, 2014, the entire contents of which are incorporated herein by reference.

FIELD

The embodiments disclosed herein are related to an information processing system, a control device and a control method.

BACKGROUND

An overlay network is known wherein a plurality of logical networks are constructed on a physical network by tunneling. In such an overlay network as just described, a client packet is encapsulated, and an identifier of a logical network is stored into a header of the encapsulated packet. Then, the encapsulated packet is transferred in a logical network corresponding to the identifier included in the header. Each logical network is terminated at a terminating device such as a virtual extensible local area network (VXLAN) tunnel end point (VTEP).

A packet transmission method is known wherein a transmission port from which a packet is to be transmitted is selected based on a hash value calculated from header information of the packet and the packet is transmitted from the selected transmission port. For the calculation of a hash value, for example, the 5-tuple in the header information is used. The 5-tuple includes a transmission source internet protocol (IP) address, a destination IP address, a transmission source port number, a destination port number and a protocol number. The 5-tuple makes it possible to suppress the deviation of transmission paths of flows including a series of packets in the network.

However, in an overlay network in a data center or the like, a packet is transmitted between terminating devices of tunneling. Therefore, pieces of header information of packets transmitted between the same pair of terminating devices are same. Therefore, also hash values calculated from the header information are same as each other, and the transmission paths of packets sometimes deviate. A technology is known wherein, in order to reduce the deviation, the transmission source port number in the header of an encapsulated packet is replaced by a hash value calculated from a client packet. As related art, for example, Japanese Laid-open Patent Publication No. 2004-254132 is disclosed.

Incidentally, when a port from which a packet is to be transmitted is selected based on a hash value calculated from header information of the packet, in the long run, ports are logically selected uniformly, and the deviation of transmission paths of flows is suppressed. However, in the short run, the ports are not necessarily selected uniformly. Therefore, in the short run, selection is concentrated on some of the ports and flows are concentrated on some of the transmission paths in the network in some cases.

In an overlay network, when a hash value calculated from a client packet is stored into the header of an encapsulated packet, the calculation algorithm for a hash value relies upon a hypervisor incorporated in a device that carries out encapsulation. Therefore, a user of the device that performs encapsulation does not know what hash value is calculated from a client packet. It is not known from which port a packet including a client packet is transmitted. Therefore, it is not known what flow distribution is exhibited for each path. From the foregoing, it is desirable to make it possible to achieve precise management of transmission paths of flows such as suppression of deviation of flows.

SUMMARY

According to an aspect of the invention, an information processing system includes a switch device including a plurality of ports; and a control device configured to control the switch device, wherein the control device is configured to: specify a flow in which a transmission port is to be changed among the plurality of flows and a transmission port after the change, by referring, for every plurality of flows respectively including a series of packets having a common attribute, to load distribution information that associates flow information for identifying the flows and port information indicating a transmission port from which packets belonging to the flows are to be transmitted with each other and statistics information indicating a use rate of each of the plurality of ports, and transmit a changing instruction packet, which includes information of the specified flow and information of the port after the change, for instructing the switch device to change the transmission port to the switch device, and wherein the switch device is configured to update information in header information, which each of the series of packets included in the specified flow includes, so as to become information with which the port after the change is selected, when the changing instruction packet is received from the control device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, embodiments of an information processing system, a control device and a control program for the control device disclosed herein are described in detail with reference to the drawings. The embodiments described below do not restrict the technology disclosed herein. Further, the embodiments can be combined suitably within a range within which processing contents are not contradictory.

[First Embodiment]

Figure 1:
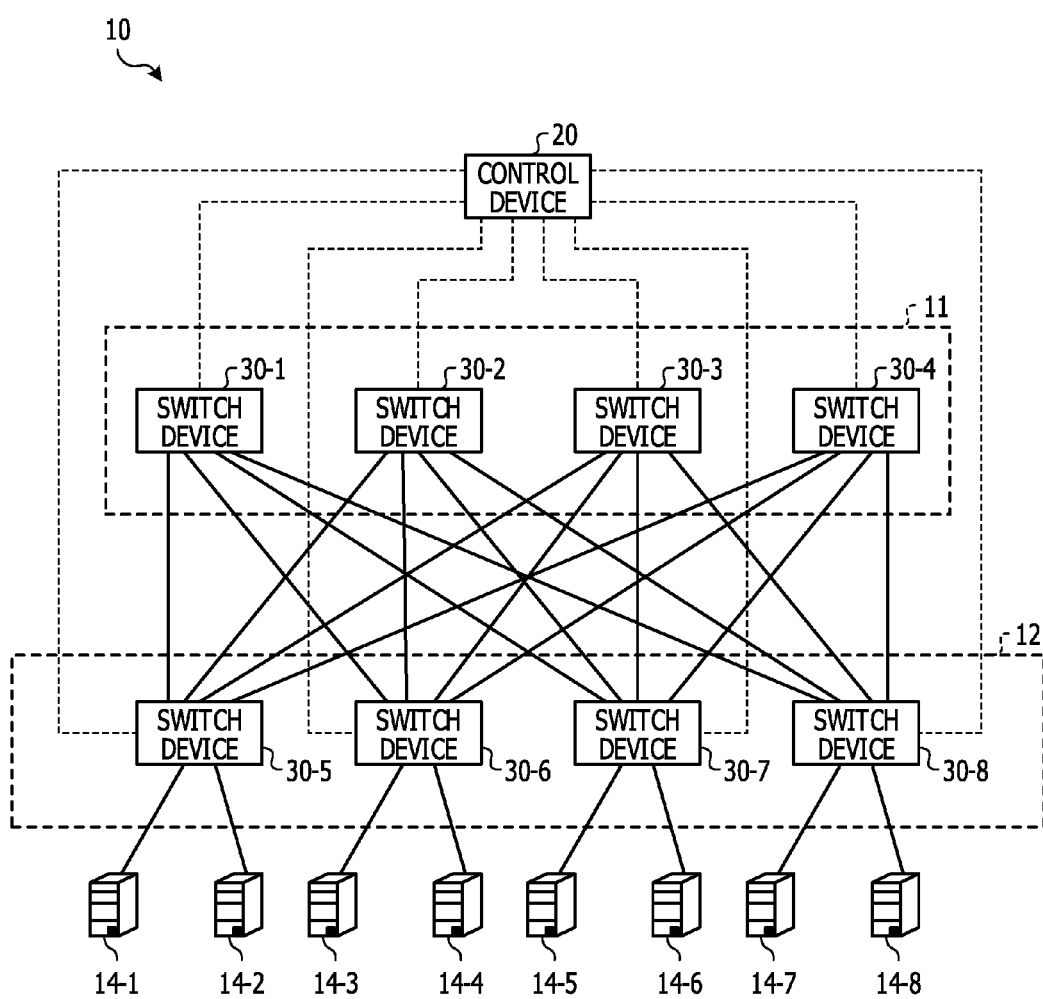
FIG. 1 is a view depicting an example of an information processing system.

FIG. 1 is a view depicting an example of an information processing system. An information processing system 10 includes a control device 20, a plurality of switch devices 30-1 to 30-8, and a plurality of communication devices 14-1 to 14-8. The information processing system 10 is provided, for example, in a data center. Each of the plurality of communication devices 14-1 to 14-8 is, for example, a server. In the following description, where the plurality of switch devices 30-1 to 30-8 are collectively referred to without distinction thereamong, they are referred to as switch device 30. Where the plurality of communication devices 14-1 to 14-8 are collectively referred to without distinction thereamong, they are referred to as communication device 14.

The information processing system 10 includes a higher order switch group 11 including the plurality of switch devices 30-1 to 30-4 and a lower order switch group 12 including the plurality of switch devices 30-5 to 30-8. The plurality of switch devices 30-1 to 30-4 are, for example, Spine switches. The plurality of switch devices 30-5 to 30-8 are, for example, Leaf switches. Each of the switch devices 30-5 to 30-8 included in the lower order switch group 12 is coupled to two or more switch devices 30 from among the plurality of switch devices 30-1 to 30-4 included in the higher order switch group 11. Each of the switch devices 30-5 to 30-8 included in the lower order switch group 12 is coupled to communication devices 14. The plurality of switch devices 30 configure, for example, a fat-tree topology.

In the present embodiment, each communication device 14 implements a plurality of virtual servers. Each virtual server performs communication with a virtual server provided in a different communication device 14 through a logical network implemented on a physical network constructed from the plurality of switch devices 30. The logical network is terminated by a terminating device such as a VTEP provided in the communication devices 14. The logical network is implemented, for example, by a VXLAN. The switch devices 30 are coupled to each other by, for example, a data network indicated by solid lines in FIG. 1. Each of the switch devices 30 is coupled to the control device 20 through, for example, a management network indicated by broken lines in FIG. 1.

The terminating device provided in each of the communication devices 14 calculates a hash value using the header of an original packet produced by the virtual server in the communication device 14. Then, the terminating device generates a header in which the calculated hash value is set to the transmission source port number and encapsulates the original packet with a packet including the generated header. Then, the terminating device transmits the packet encapsulated from the original packet to the switch device 30 through the data network. Each of the switch devices 30 transfers the received packet to a different switch device 30 in accordance with information of the header of the packet.

When a packet is to be transmitted from an aggregation port that includes a plurality of transmission ports, the switch device 30 selects one of the transmission ports of the aggregation port through which the packet is to be transmitted based on a hash value calculated from an original packet. Then, the switch device 30 transmits the packet through the selected transmission port. The packet transferred by the switch device 30 is transmitted to a communication device 14 in which a virtual server of the destination is implemented and is decapsulated by the terminating device in the communication device 14. Then, the virtual server of the destination of the original packet receives the original packet.

Figure 2:
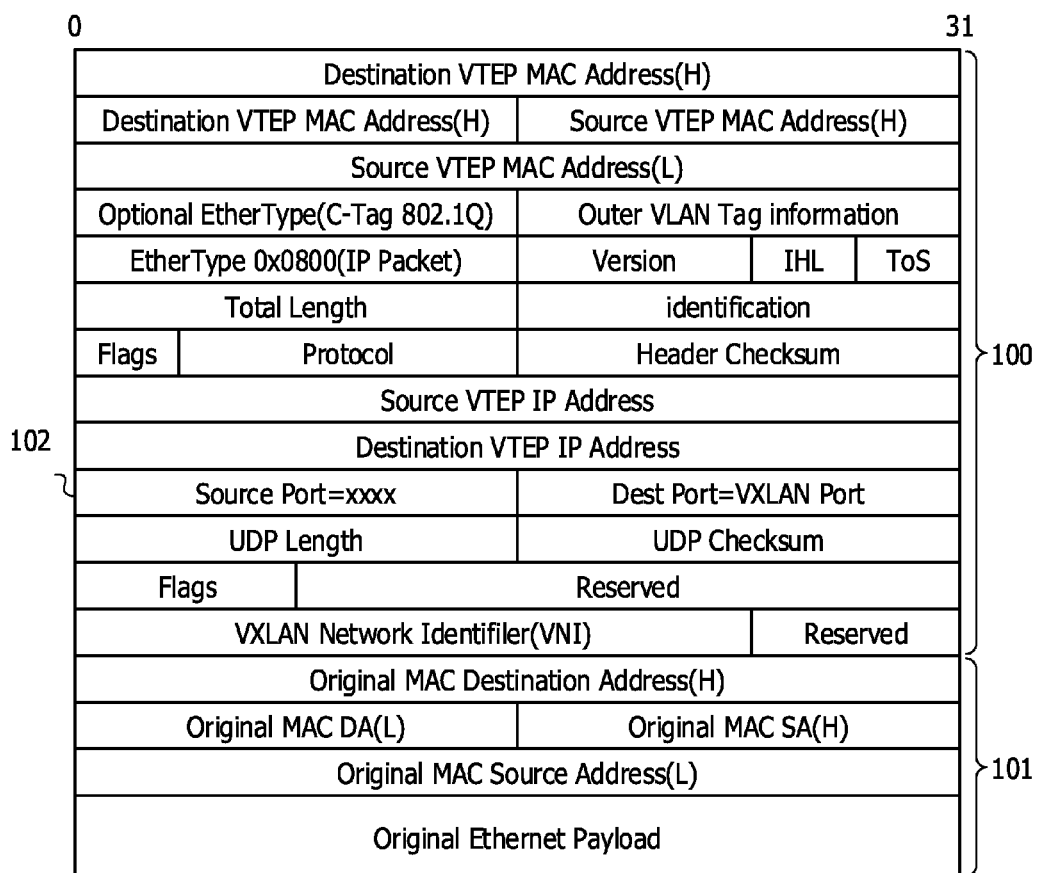
FIG. 2 is a view depicting an example of a header of a packet transmitted in an information processing system.

FIG. 2 is a view depicting an example of a header of a packet transmitted in an information processing system. The information processing system described with reference to FIG. 2 may be the information processing system 10 depicted in FIG. 1. The original packet transmitted from the virtual server in the communication device 14 is encapsulated, for example, into a user datagram protocol (UDP) packet by a VTEP provided in the communication device 14. For example, as depicted in FIG. 2, in a transmission source port number 102 in a header 100 of a packet, a hash value calculated from a header of an encapsulated original packet 101 is stored. In the following, a packet encapsulated from an original packet and transmitted in the information processing system 10 is hereinafter referred to simply as packet.

Figure 3:
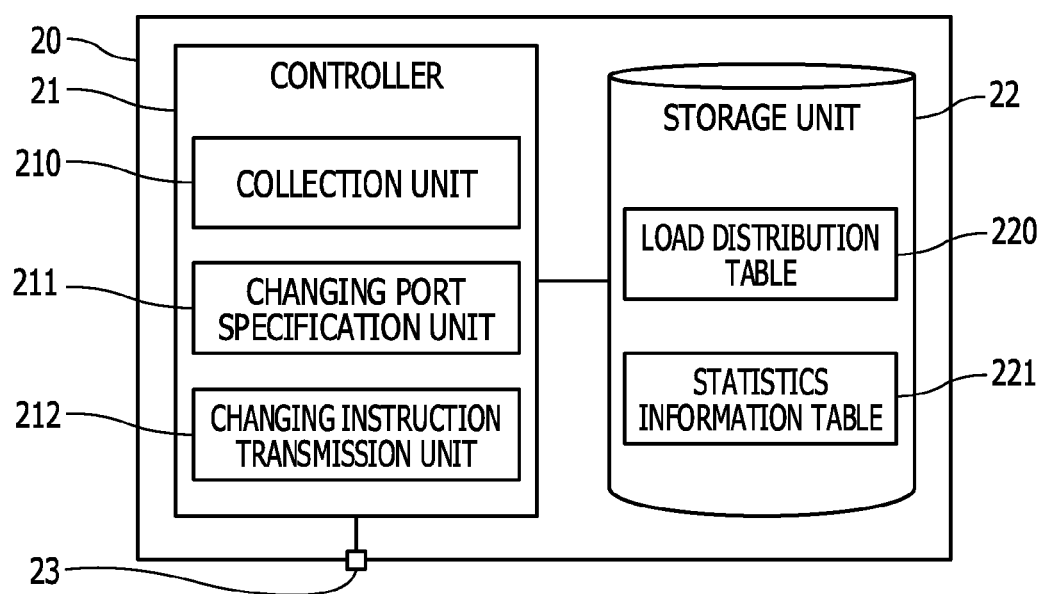
FIG. 3 is a block diagram depicting an example of a control device in a first embodiment.

FIG. 3 is a block diagram depicting an example of a control device in the first embodiment. The control device depicted in FIG. 3 may be the control device 20 depicted in FIG. 1. The control device 20 includes a controller 21, a storage unit 22 and a management port 23. The controller 21 includes a collection unit 210, a changing port specification unit 211, and a changing instruction transmission unit 212. The storage unit 22 stores a load distribution table 220 and a statistics information table 221 therein. The management port 23 is coupled to the switch devices 30 through the management network.

Figure 4:
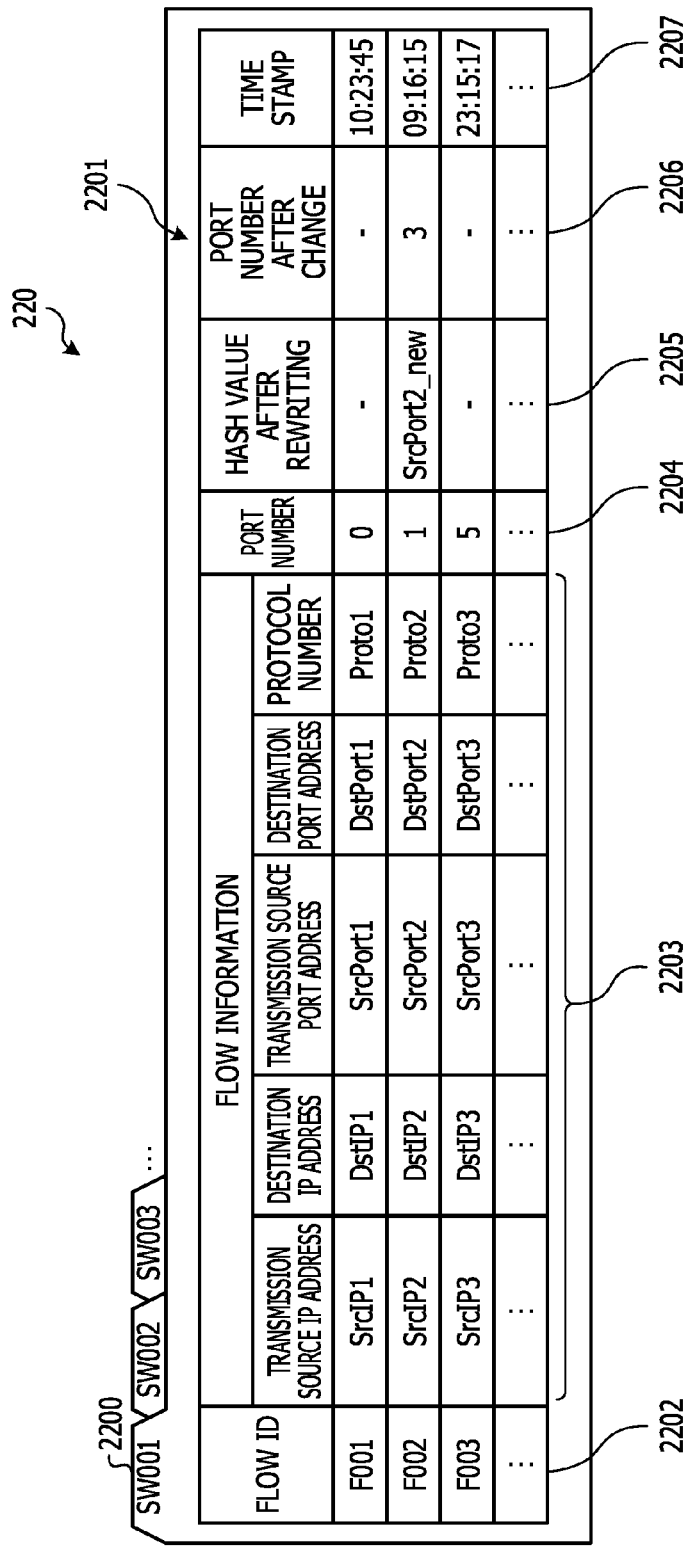
FIG. 4 is a view depicting an example of a load distribution table.

FIG. 4 is a view depicting an example of a load distribution table. The load distribution table depicted in FIG. 4 may be the load distribution table 220 depicted in FIG. 3. In the load distribution table 220, for example, an individual table 2201 is stored for each of switch identifications (IDs) 2200 for specifying the respective switch devices 30 as depicted in FIG. 4. In each of the individual tables 2201, flow IDs 2202, flow information 2203, port numbers 2204, hash values 2205 after rewriting, port numbers 2206 after change, and timestamps 2207 are stored in an associated relationship with each other.

The flow IDs 2202 are pieces of information for specifying individual flows. A flow indicates a group of packets that flow on a network and have a common attribute. In the present embodiment, a packet group in which a transmission source IP address, a destination IP address, a transmission source port number, a destination port number and a protocol number are common is called flow. In the present embodiment, in each transmission source port number, a hash value calculated from a header of an encapsulated original packet is stored.

The flow information 2203 is information of a header common to packets included in a flow. In the present embodiment, the flow information 2203 includes a transmission source IP address, a destination IP address, a transmission source port number, a destination port number and a protocol number. Each port number 2204 is a number of a transmission port of the switch device 30 to which a packet included in the flow is transmitted. Each hash value 2205 after rewriting is a hash value set to a transmission source port number in a header of a packet when the transmission source port number is rewritten by the switch device 30. Each port number 2206 after change is a port number of a transmission port from which a packet included in the flow is to be transmitted after the transmission port is changed. Each timestamp 2207 indicates time at which the corresponding flow ID 2202, flow information 2203, port number 2204, hash value 2205 after rewriting or port number 2206 after change associated with the timestamp 2207 is updated.

Figure 5:
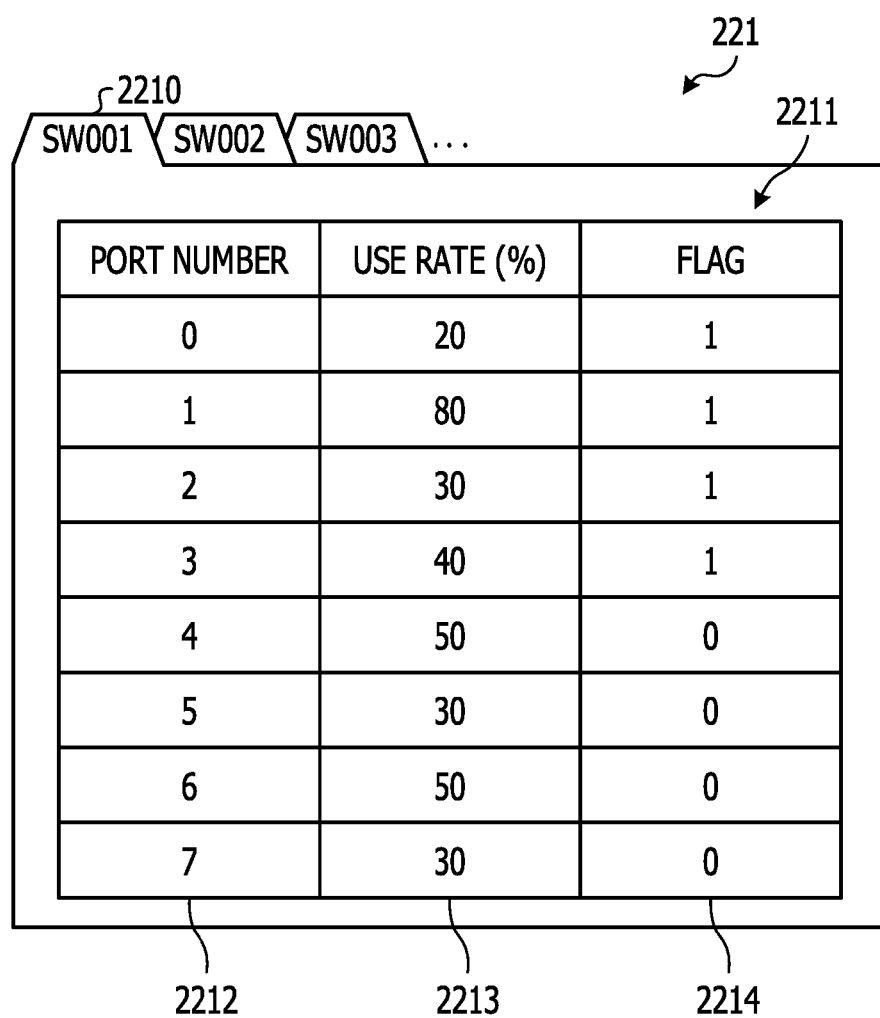
FIG. 5 is a view depicting an example of a statistics information table.

FIG. 5 is a view depicting an example of a statistics information table. The statistics information table depicted in FIG. 5 may be the statistics information table 221 depicted in FIG. 3. In the statistics information table 221, for example, an individual table 2211 is stored for each of switch IDs 2210 as depicted in FIG. 5. In each of the individual tables 2211, port numbers 2212, use rates 2213 and flags 2214 are stored in an associated relationship with each other. Each flag 2214 is information representative of whether or not a transmission port corresponding to a port number 2212 is allocated to an aggregation port. In each flag 2214, for example, 1 is stored where the transmission port corresponding to the port number 2212 is allocated to an aggregation port. In each flag 2214, for example, 0 is stored where the transmission port corresponding to the port number 2212 is not allocated to an aggregation port. The value of the flags 2214 is set, for example, by a manager or the like of the information processing system 10.

Referring back to FIG. 3, the collection unit 210 transmits a monitoring condition, which is a condition for extracting header information of a packet, to the respective switch devices 30 through the management port 23 in accordance with an instruction from the manager or the like of the information processing system 10. In the present embodiment, the monitoring condition is a condition that, for example, header information of a packet received every given interval of time be extracted. The monitoring condition may be a condition that header information of received packets be extracted for every given number of packets or a like condition.

The collection unit 210 extracts, when header information is received from a switch device 30 through the management port 23, a transmission source IP address, a destination IP address, a transmission source port number, a destination port number and a protocol number as flow information from the received header information. Then, the collection unit 210 specifies an individual table corresponding to the switch device 30 of the transmission source of the header information in the load distribution table 220. Then, the collection unit 210 decides whether or not the flow information extracted from the header information is registered already in the specified individual table. If the flow information is not registered in the individual table, then the collection unit 210 newly generates a flow ID corresponding to the flow information. Then, the collection unit 210 registers the flow information in an associated relationship with the newly generated flow ID into the individual table.

If the flow information is registered in an associated relationship with the flow ID into the individual table, then the collection unit 210 further extracts a destination media access control (MAC) address from the header information received from the switch device 30. Then, the collection unit 210 generates a DestPhyPortGet packet that is a packet for inquiring about a transmission port of the switch device 30 from which a packet included in the flow corresponding to the extracted flow information is to be transmitted. Then, the collection unit 210 transmits the generated DestPhyPortGet packet to the switch device 30 of the transmission source of the header information through the management port 23. The DestPhyPortGet packet is an example of a port inquiring packet. The DestPhyPortGet packet includes a destination MAC address and flow information.

Then, if a port number of the transmission port is received from the switch device 30 through the management port 23, then the collection unit 210 specifies an individual table corresponding to the switch device 30 of the transmission source of the port number in the load distribution table 220. Then, the collection unit 210 registers the received port number in an associated relationship with the flow information included in the DestPhyPortGet packet into the specified individual table.

If a use rate for each transmission port is received from the switch device 30 through the management port 23, then the collection unit 210 specifies an individual table corresponding to the switch device 30 of the transmission source of the use rate for each transmission port in the statistics information table 221. Then, the collection unit 210 updates the use rates in the specified individual table with the received use rates of the individual transmission ports.

The changing port specification unit 211 refers to the load distribution table 220 and the statistics information table 221 in the storage unit 22 to specify a flow whose transmission port is to be changed and a port number of the transmission port after change. For example, the changing port specification unit 211 refers to the statistics information table 221 to decide, for each switch device 30, whether or not a port number of a transmission port with which a use rate equal to or higher than a given value is associated exists in port numbers of transmission ports allocated to an aggregation port. The given value is, for example, a use rate of 90%.

If a port number of a transmission port with which a use rate equal to or higher than the given value is associated exists in the port numbers of the transmission ports allocated to the aggregation port, then the changing port specification unit 211 decides whether or not a different transmission port of a use rate lower than the given value exists in the transmission ports allocated to the aggregation port. If a different transmission port of a use rate lower than the given value exists in the transmission ports allocated to the aggregation port, then the changing port specification unit 211 specifies the port number of the transmission port having a use rate equal to or higher than the given value as the port number of the transmission port to be changed. The changing port specification unit 211 specifies the port number of the different transmission port having a use rate lower than the given value as the port number of the transmission port after change.

Then, the changing port specification unit 211 refers to the load distribution table 220 to specify the flow information associated with the port number of the transmission port to be changed as flow information of the flow whose transmission port is to be changed. Then, the changing port specification unit 211 transmits the specified flow information and the port number of the transmission port after change to the changing instruction transmission unit 212.

When the flow information and the port number of the transmission port are received from the changing port specification unit 211, the changing instruction transmission unit 212 generates a DestPhyPortSet packet including the received flow information and port number. Then, the changing instruction transmission unit 212 transmits the generated DestPhyPortSet packet to a switch device 30 through the management port 23. The DestPhyPortSet packet is an example of a changing instruction packet. The DestPhyPortSet packet includes the transmission source IP address, destination IP address, transmission source port number, destination port number and protocol number as the flow information and includes the port number of the transmission port after change as the port number.

Then, the changing instruction transmission unit 212 receives, as a response to the DestPhyPortSet packet, a hash value set to the transmission source port number in the header of the packet from the switch device 30 through the management port 23. Then, the changing instruction transmission unit 212 specifies an individual table corresponding to the switch device 30 of the transmission source of the received hash value in the load distribution table 220. Then, the changing instruction transmission unit 212 registers the hash value received from the switch device 30 in an associated relationship with the flow information included in the DestPhyPortSet packet as a hash value after rewriting into the specified individual table. The changing instruction transmission unit 212 registers the port number included in the DestPhyPortSet packet in an associated relationship with the flow information included in the DestPhyPortSet packet as a port number after change into the specified individual table.

Figure 6:
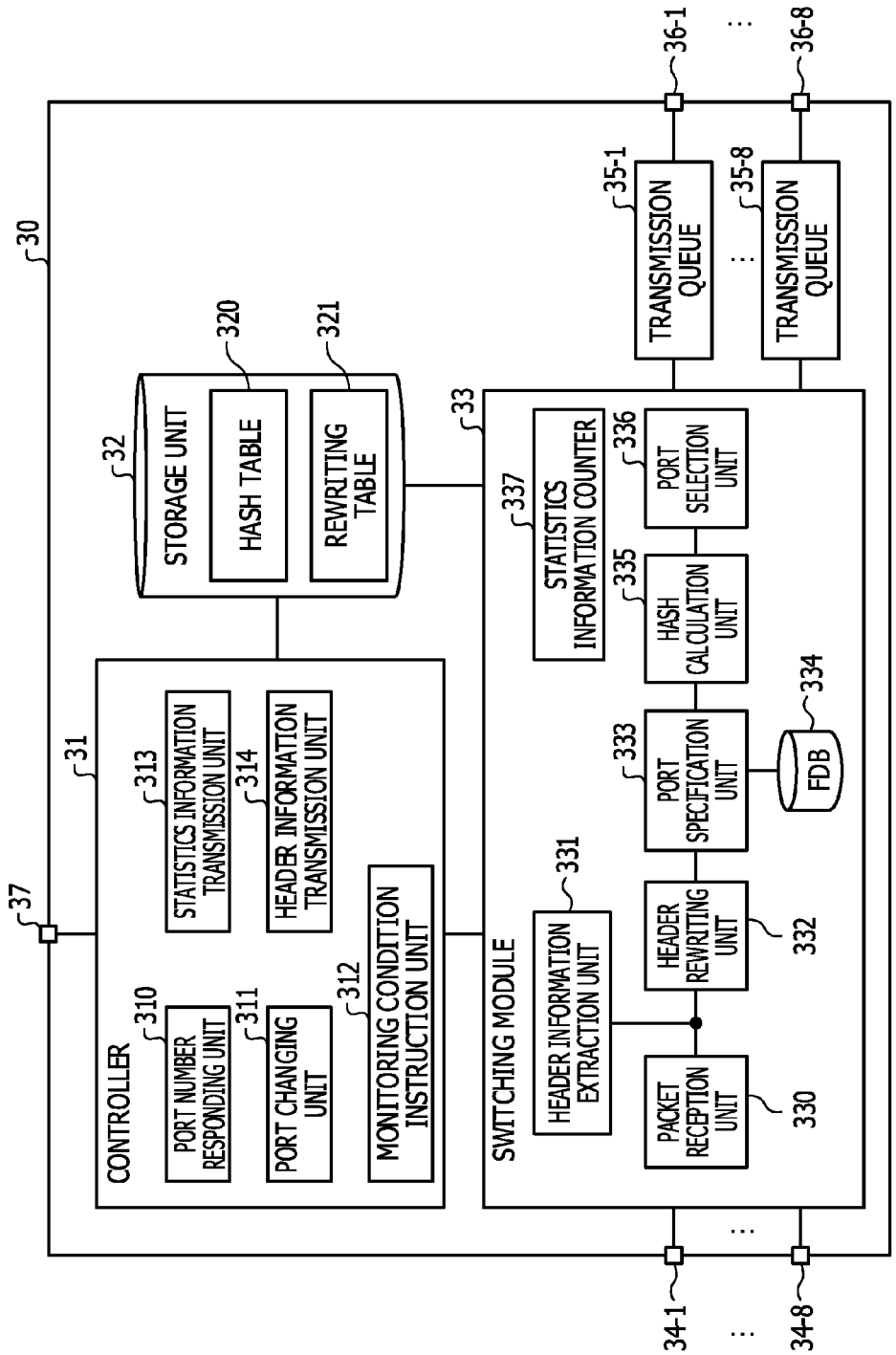
FIG. 6 is a block diagram depicting an example of a switch device in the first embodiment.

FIG. 6 is a block diagram depicting an example of a switch device in the first embodiment. The switch device depicted in FIG. 6 may be the switch device 30 depicted in FIG. 1. The switch device 30 includes a controller 31, a storage unit 32, a switching module 33, a plurality of reception ports 34-1 to 34-8, a plurality of transmission queues 35-1 to 35-8, a plurality of transmission ports 36-1 to 36-8 and a management port 37. Each of the plurality of reception ports 34-1 to 34-8 is coupled to a communication device 14 or a different switch device 30 through a data network. Each of the plurality of transmission ports 36-1 to 36-8 is coupled to a communication device 14 or a different switch device 30 through a data network. The management port 37 is coupled to the control device 20 through a management network.

In the following description, where the plurality of reception ports 34-1 to 34-8 are collectively referred to without distinction thereamong, they are referred to as reception port 34. Where the plurality of transmission queues 35-1 to 35-8 are collectively referred to without distinction thereamong, they are referred to as transmission queue 35. Where the plurality of transmission ports 36-1 to 36-8 are collectively referred to without distinction thereamong, they are referred to as transmission port 36. In the present embodiment, the numbers of the plurality of reception ports 34, the plurality of transmission queues 35 and the plurality of transmission ports 36 are all eight. In the present embodiment, four transmission ports 36 among the eight transmission ports 36 are allocated to the aggregation port.

Figure 7:
FIG. 7 is a view depicting an example of a hash table.

The storage unit 32 stores a hash table 320 and a rewriting table 321 therein. FIG. 7 is a view depicting an example of a hash table. The hash table depicted in FIG. 7 may be the hash table 320 depicted in FIG. 6. For example, as depicted in FIG. 7, hash values 3201 are stored in an associated relationship with indexes 3200 in the hash table 320. The indexes 3200 correspond to the number of the transmission ports 36 allocated to the aggregation port. In the present embodiment, since the number of the transmission ports 36 allocated to the aggregation port is four, four values from 0 to 3 are allocated as the indexes 3200. In the present embodiment, the hash values 3201 include a plurality of values calculated in advance for the individual indexes 3200 by the manager or the like of the information processing system 10 and stored in the hash table 320.

Here, a calculation method of a hash value 3201 associated with each index 3200 is described. In the present embodiment, hash arithmetic operation is performed utilizing, for example, cyclic redundancy check (CRC) arithmetic operation. In the present embodiment, for example, CRC16 is used as the CRC arithmetic operation. In the following calculation, the hash arithmetic operation that utilizes the CRC arithmetic operation is represented by "LagHash( )."

First, the manager successively changes the value of a variable i of 16 bits from 0 to 65535 and calculates the calculation expression (1) given below for each of the values of the variable i to calculate 65536 hash values temp:

$$\text{temp}=\text{LagHash}(0x0000000, 0x00000000, i, 0x0000, 0x00). \quad (1)$$

Then, the manager divides each of the calculated hash values temp by the number of the transmission ports allocated to the aggregation port to calculate a remainder. In the present embodiment, the number of the transmission ports allocated to the aggregation port is four. Then, the manager registers the respective calculated hash values temp in an associated relationship with indexes of values equal to the calculated remainders into the hash table 320. Consequently, the hash table 320 in which the hash values 3201 are associated with the indexes 3200 of values of the lower two bits of the hash values 3201 as depicted in FIG. 7 is generated.

Figure 8:
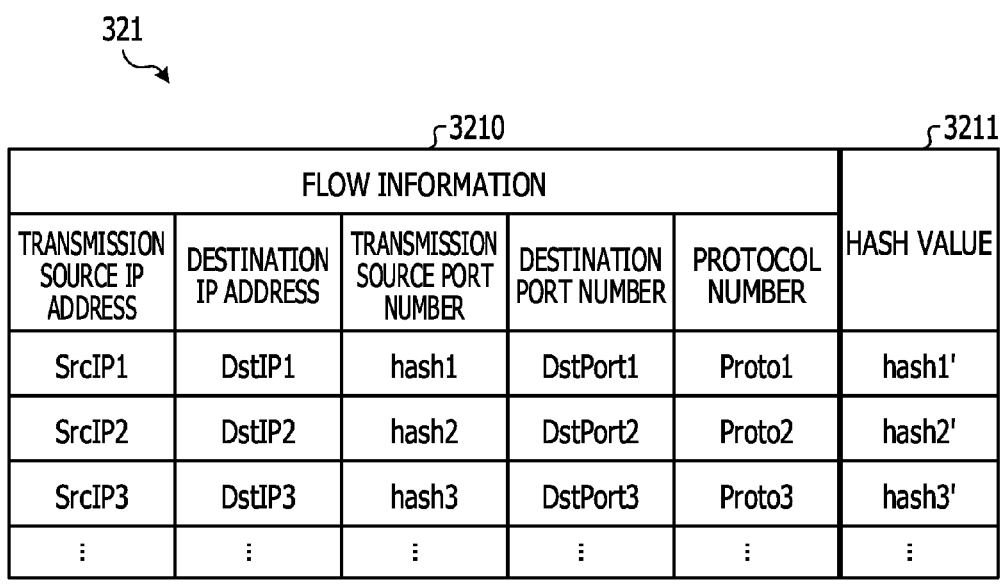
FIG. 8 is a view depicting an example of a rewriting table.

FIG. 8 is a view depicting an example of a rewriting table. The rewriting table depicted in FIG. 8 may be the rewriting table 321 depicted in FIG. 6. In the rewriting table 321, hash values 3211 are stored in an associated relationship with flow information 3210, for example, as depicted in FIG. 8. In the present embodiment, the flow information 3210 includes a transmission source IP address, a destination IP address, a transmission source port number, a destination port number and a protocol number included in a header of a packet encapsulated from an original packet. In the transmission source port number in the flow information 3210, a hash value calculated from the header of the original packet is stored. Each hash value 3211 is a value with which, when the switch device 30 receives a packet with the header including the flow information 3210, the transmission source port number in the header of the packet is rewritten by the switch device 30.

Referring back to FIG. 6, the switching module 33 includes a packet reception unit 330, a header information extraction unit 331, a header rewriting unit 332, a port specification unit 333, a forwarding database (FDB) 334, a hash calculation unit 335 and a port selection unit 336. The packet reception unit 330 receives a packet from a communication device 14 or a different switch device 30 through a respective reception port 34. Then, the packet reception unit 330 transmits the received packet to the header information extraction unit 331 and the header rewriting unit 332.

The header information extraction unit 331 extracts header information from within a packet that satisfies a monitoring condition designated from the controller 31 from among packets received from the packet reception unit 330. In the present embodiment, the header information extraction unit 331 samples a packet received by the packet reception unit 330 every given interval of time and extracts header information from the sampled packet. Then, the header information extraction unit 331 transmits the extracted header information to the controller 31. The header information extraction unit 331 may mechanically cut out data of a given number of bits such as 100 bytes from the top of the packet and transmit the cut data as header information to the controller 31.

The header rewriting unit 332 refers to the rewriting table 321 when the header rewriting unit 332 receives a packet from the packet reception unit 330 to search the rewriting table 321 for flow information included in the header of the packet received from the packet reception unit 330. If the flow information included in the header of the packet received from the packet reception unit 330 does not exist in the rewriting table 321, then the header rewriting unit 332 transmits the packet received from the packet reception unit 330 to the port specification unit 333.

On the other hand, if the flow information included in the header of the packet received from the packet reception unit 330 exists in the rewriting table 321, then the header rewriting unit 332 acquires a hash value associated with the flow information from the rewriting table 321. Then, the header rewriting unit 332 rewrites the transmission source port number in the header of the packet received from the packet reception unit 330 with the acquired hash value. Then, the header rewriting unit 332 transmits the packet of which the transmission source port number in the header has been rewritten to the port specification unit 333.

In the FDB 334, a port number of the transmission port 36 is stored in an associated relationship with the MAC address. As regards the aggregation port, port numbers of the plurality of transmission ports 36 allocated to the aggregation port are associated with the MAC address.

If a packet is received from the header rewriting unit 332, then the port specification unit 333 refers to the FDB 334 to specify a port number associated with the destination MAC address in the header of the packet received from the header rewriting unit 332. Then, the port specification unit 333 transmits the specified port number to the hash calculation unit 335 together with the packet received from the header rewriting unit 332. If a plurality of port numbers are associated with the destination MAC address in the header of the packet received from the header rewriting unit 332, then the port specification unit 333 refers to the FDB 334 to specify the plurality of port numbers and transmits the plurality of port numbers to the hash calculation unit 335 together with the packet.

If a MAC address is received from the controller 31, then the port specification unit 333 refers to the FDB 334 to specify a port number associated with the MAC address received from the controller 31. Then, the port specification unit 333 transmits the specified port number to the controller 31.

If a port number is received together with a packet from the port specification unit 333, then the hash calculation unit 335 decides whether or not a plurality of port numbers are received from the port specification unit 333. If a plurality of port numbers are received from the port specification unit 333, then the hash calculation unit 335 calculates a hash value using the flow information in the header of the packet received from the port specification unit 333. In the present embodiment, the hash calculation unit 335 calculates a hash value from the flow information by CRC arithmetic operation such as CRC16. Then, the hash calculation unit 335 transmits the calculated hash value to the port selection unit 336 together with the plurality of port numbers and the packet received from the port specification unit 333. On the other hand, if the number of port numbers received from the port specification unit 333 together with the packet is one, then the hash calculation unit 335 transmits the port number and the packet received from the port specification unit 333 to the port selection unit 336.

If flow information (transmission source IP address, destination IP address, destination port number and protocol number) is received from the controller 31, then the hash calculation unit 335 calculates a hash value using the received flow information. Then, the hash calculation unit 335 transmits the calculated hash value to the controller 31. If a transmission source IP address, a destination IP address, a destination port number and a protocol number are received from the controller 31, then the hash calculation unit 335 calculates a hash value using the transmission source IP address, destination IP address, destination port number and protocol number. Then, the hash calculation unit 335 transmits the calculated hash value to the controller 31.

If a plurality of port numbers and a packet are received together with a hash value from the hash calculation unit 335, then the port selection unit 336 selects one of the received plurality of port numbers based on the received hash value. In the present embodiment, the switch device 30 includes eight transmission ports 36, and four transmission ports 36 of the eight transmission ports 36 are allocated to the aggregation port. Further, port numbers from 0 to 3 are individually allocated to the aggregation port. In the present embodiment, the port selection unit 336 selects one port number equal to the value of the lower two bits of the hash value received from the hash calculation unit 335. Then, the port selection unit 336 stores the packet received from the hash calculation unit 335 into the transmission queue 35 coupled to the transmission port 36 corresponding to the selected port number.

If one port number is received together with a packet from the hash calculation unit 335, then the port selection unit 336 stores the received packet into the transmission queue 35 coupled to the transmission port 36 corresponding to the received port number.

If a hash value is received together with a plurality of port numbers from the controller 31, then the port selection unit 336 selects one of the plurality of received port numbers based on the received hash value. Then, the port selection unit 336 transmits the selected port number to the controller 31.

The transmission queues 35 are provided in a one by one corresponding relationship to the transmission ports 36. Each of the transmission queues 35 transmits a packet stored therein from the port selection unit 336 from the transmission port 36 coupled to the transmission queue 35.

A statistics information counter 337 counts, for each transmission port 36, the number of packets transmitted from the transmission port 36. Then, the statistics information counter 337 calculates and retains a use rate of each of the transmission ports 36 based on the counted packet number for each transmission port 36. Then, if a use rate is requested from the controller 31, then the statistics information counter 337 transmits the use rate for each transmission port 36 to the controller 31.

The controller 31 includes a port number responding unit 310, a port changing unit 311, a monitoring condition instruction unit 312, a statistics information transmission unit 313 and a header information transmission unit 314. If a DestPhyPortGet packet is received from the control device 20 through the management port 37, then the port number responding unit 310 transmits a destination MAC address included in the DestPhyPortGet packet to the port specification unit 333. Then, the port number responding unit 310 receives a port number from the port specification unit 333. If the number of port numbers received from the port specification unit 333 is one, then the port number responding unit 310 transmits the port number received from the port specification unit 333 to the control device 20 through the management port 37.

On the other hand, if the number of port numbers received from the port specification unit 333 is a plural number, then the port number responding unit 310 transmits flow information included in the DestPhyPortGet packet to the hash calculation unit 335. Then, the port number responding unit 310 receives a hash value from the hash calculation unit 335. Then, the port number responding unit 310 transmits the hash value received from the hash calculation unit 335 to the port selection unit 336 together with the plurality of port numbers received from the port specification unit 333. Then, the port number responding unit 310 receives one port number from the port selection unit 336. Then, the port number responding unit 310 transmits the port number received from the port selection unit 336 to the control device 20 through the management port 37.

If a DestPhyPortSet packet is received from the control device 20 through the management port 37, then the port changing unit 311 specifies a hash value to be replaced with the transmission source port number in the header of the packet included in the flow corresponding to the flow information included in the DestPhyPortSet packet. Then, the port changing unit 311 registers the specified hash value in an associated relationship with the flow information included in the DestPhyPortSet packet into the rewriting table 321. Then, the port changing unit 311 transmits the hash value registered in the rewriting table 321 as a response to the DestPhyPortSet packet to the control device 20 through the management port 37.

Here, a method of specifying a hash value to be replaced with the transmission source port number in the header is described. In the calculation described below, the hash arithmetic operation that utilizes CRC arithmetic operation is represented by "LagHash( )" The transmission source IP address of 32 bits is represented by "SrcIP," and the destination IP address of 32 bits is represented by "DstIP." The transmission source port number of 16 bits is represented by "SrcPort," the destination port number of 16 bits by "DstPort," and the protocol number of eight bits by "Protocol."

First, due to the linearity of the CRC arithmetic operation, the following relational expression (2) is satisfied:

LagHash(SrcIP,DstIP,SrcPort,DstPort,Protocol)=
LagHash(SrcIP, DstIP, 0x0000, DstPort, Protocol)^LagHash(0x00000000, 0x00000000, SrcPort, 0x0000, 0x00)=temp1^temp2.   (2)

Here, temp1 represents a hash value calculated using values of "SrcIP," "DstIP," "DstPort" and "Protocol." temp2 represents a hash value calculated from a value of "SrcPort." "^" represents an exclusive or (XOR).

In the present embodiment, the port number of the transmission port 36 from which a packet is to be transmitted is selected with the value of the lower two bits of the hash value using the flow information. Therefore, if the port number of the transmission port 36 selected by the port selection unit 336 is represented by "dest," then the following relationship expression (3) is satisfied:

dest=LagHash(SrcIP, DstIP, SrcPort, DstPort, Protocol) AND 0x0003=(temp1^temp2) AND 0x0003.   (3)

If the relational expression (3) above is transformed, then the following relational expression (4) is obtained:

temp1^dest=temp2 AND 0x0003.   (4)

If the relational expression (4) above is referred to, then it can be recognized that, if the hash value temp2 the lower two bits of which have a value equal to a result of the XOR calculation of the hash value temp1 and the port number dest is set to "SrcPort," then a packet is to be transmitted from the transmission port 36 corresponding to the port number dest. Therefore, when the transmission port 36 is to be changed, if the hash value temp2 the lower two bits of which have a value equal to a result of the XOR calculation of the hash value temp1 and the port number dest of the transmission port 36 after change is set to "SrcPort," then it can be recognized that a packet is transmitted from the transmission port 36 after change. A plurality of hash values of which the value of the lower two bits is used as an index are registered in advance in the hash table 320 depicted in FIG. 7. Therefore, the hash value temp2 the lower two bits of which have a value equal to a result of the XOR calculation of the hash value temp1 and the port number dest of the transmission port 36 after change can be specified from among the hash values associated with the index of a value equal to the value of the lower two bits.

In the present embodiment, the port changing unit 311 first extracts a transmission source IP address, a destination IP address, a destination port number and a protocol number from within flow information included in a DestPhyPortSet packet received from the control device 20. Then, the port changing unit 311 transmits the extracted transmission source IP address, destination IP address, destination port number and protocol number to the hash calculation unit 335. Then, the port changing unit 311 receives a hash value temp1 from the hash calculation unit 335.

Then, the port changing unit 311 calculates an XOR between the port number of the transmission port 36 after change included in the DestPhyPortSet packet received from the control device 20 and the hash value temp1 received from the hash calculation unit 335. Then, the port changing unit 311 refers to the hash table 320 to specify, from among a plurality of hash values associated with the index of the value equal to the value of the lower two bits of a result of the XOR calculation, one hash value as the hash value temp2. For example, the port changing unit 311 preferably specifies, from among a plurality of hash values in the hash table 320, a hash value whose elapsed time after the last specification of a hash value is the longest. Then, the port changing unit 311 registers the specified hash value temp2 in an associated relationship with the flow information included in the DestPhyPortSet packet into the rewriting table 321. Then, the port changing unit 311 transmits, as a response to the DestPhyPortSet packet, the hash value temp2 registered in the rewriting table 321 to the control device 20 through the management port 37.

Consequently, the hash value temp2 to be replaced with the transmission source port number in the header of packets included in a flow corresponding to the flow information included in the DestPhyPortSet packet is registered into the rewriting table 321. Then, the header rewriting unit 332 rewrites the transmission source port number in the header of packets including the header including the flow information registered in the rewriting table 321 with the hash value temp2 stored in the rewriting table 321. Then, the hash calculation unit 335 calculates a hash value using the flow information in the header whose transmission source port number has been rewritten, and the port selection unit 336 selects a transmission port 36 using the calculated hash value. Consequently, a packet that includes, in the header thereof, the flow information included in the DestPhyPortSet packet is transmitted from the transmission port 36 of the port number included in the DestPhyPortSet packet.

Consequently, the control device 20 can arbitrarily change the transmission port 36 from which the packet included in the flow is to be transmitted. Therefore, the control device 20 can suppress deviation of transmission paths of flows in the information processing system 10 configured from the plurality of switch devices 30. Also it is possible for the control device 20 to increase or decrease flows that pass through a particular switch device 30. In this manner, the control device 20 can perform precise management of transmission paths of flows.

The monitoring condition instruction unit 312 receives a monitoring condition of a packet from the control device 20 through the management port 37 and instructs the header information extraction unit 331 of the received monitoring condition. The statistics information transmission unit 313 issues a request for a use rate for each transmission port 36 to the statistics information counter 337 at every given timing and receives a use rate for each transmission port 36 from the statistics information counter 337. Then, the statistics information transmission unit 313 transmits the received use rates of the transmission ports 36 to the control device 20 through the management port 37. The header information transmission unit 314 receives header information from the header information extraction unit 331. Then, the header information transmission unit 314 transmits the received header information to the control device 20 through the management port 37.

Figure 9:
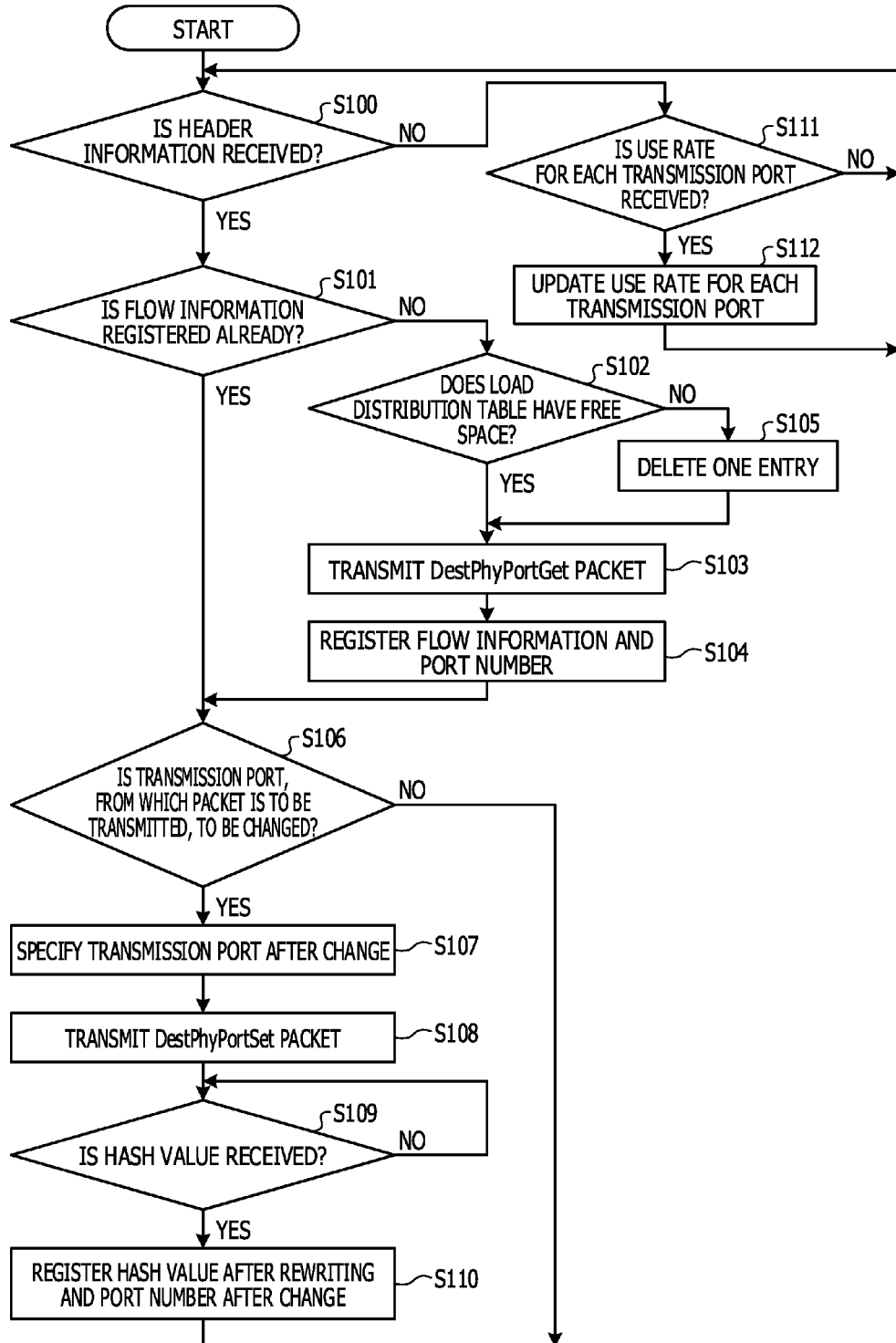
FIG. 9 is a flow chart illustrating an example of operation of a control device in the first embodiment.

FIG. 9 is a flow chart illustrating an example of operation of a control device in the first embodiment. The control device described with reference to FIG. 9 may be the control device 20 depicted in FIG. 1.

First, the collection unit 210 decides whether or not header information is received from a switch device 30 through the management port 23 (S100). If it is decided that header information is received from a switch device 30 (S100: Yes), then the collection unit 210 extracts, from within the received header information, a transmission source IP address, a destination IP address, a transmission source port number, a destination port number and a protocol number as flow information. Then, the collection unit 210 specifies an individual table that corresponds to the switch device 30 of the transmission source of the header information in the load distribution table 220. Then, the collection unit 210 decides whether or not the flow information extracted from the received header information is registered already in the specified individual table (S101).

If it is decided that the flow information extracted from the header information is registered already in the individual table (S101: Yes), then the changing port specification unit 211 executes a process indicated at S106. On the other hand, if it is decided that the flow information extracted from the header information is not registered in the individual table as yet (S101: No), then the collection unit 210 decides whether or not the load distribution table 220 has a free space (S102). If it is decided that the load distribution table 220 has a free space (S102: Yes), then the collection unit 210 executes a process indicated at S103.

On the other hand, if it is decided that the load distribution table 220 does not have a free space (S102: No), then the collection unit 210 deletes one entry in the load distribution table 220 (S105). The collection unit 210 deletes, for example, an entry including a timestamp that exhibits the longest elapsed time period from the time indicated by the timestamp from the load distribution table 220. The load distribution table 220 includes entries including flow information, a port number, a hash value after rewriting, a port number after change and a timestamp.

Then, the collection unit 210 further extracts a destination MAC address from the header information. Then, the collection unit 210 generates a DestPhyPortGet packet that includes the destination MAC address and the flow information extracted from the header information. Then, the collection unit 210 transmits the generated DestPhyPortGet packet to the switch device 30 of the transmission source of the header information (S103). Then, the collection unit 210 receives a port number from the switch device 30. Then, the collection unit 210 generates a flow ID corresponding to the flow information extracted from the header information and registers the flow information and the port number received from the switch device 30 in an associated relationship with the generated flow ID into the individual table in the load distribution table 220 (S104).

Then, the changing port specification unit 211 decides whether or not the transmission port 36 from which the packet included in the flow is to be transmitted is to be changed (S106). The changing port specification unit 211 decides, for example, from among the transmission ports 36 allocated to the aggregation port, a transmission port 36 whose use rate is equal to or higher than a given value as the transmission port 36 to be changed. If the changing port specification unit 211 decides that the transmission port 36 is not to be changed (S106: No), then the collection unit 210 executes the process indicated at S100 again.

On the other hand, if it is decided that the transmission port 36 is to be changed (S106: Yes), then the changing port specification unit 211 specifies the transmission port 36 after change (S107). The changing port specification unit 211 specifies, for example, from among the transmission ports 36 allocated to the aggregation port, a different transmission port 36 whose use rate is lower than the given value as the transmission port 36 after change. Then, the changing port specification unit 211 transmits the flow information of the flow in which the packet to be transmitted is included and the port number of the transmission port 36 after change to the changing instruction transmission unit 212.

Then, the changing instruction transmission unit 212 generates a DestPhyPortSet packet including the flow information and the port number received from the changing port specification unit 211. Then, the changing instruction transmission unit 212 transmits the generated DestPhyPortSet packet to the switch device 30 through the management port 23 (S108). Then, the changing instruction transmission unit 212 decides whether or not a hash value to be replaced with the transmission source port number in the header of the packet is received from the switch device 30 as a response to the DestPhyPortSet packet (S109).

If it is decided that a hash value is received from the switch device 30 (S109: Yes), then the changing instruction transmission unit 212 specifies, in the load distribution table 220, an individual table corresponding to the switch ID of the switch device 30 of the transmission source of the received hash value. Then, the changing instruction transmission unit 212 registers the hash value received from the switch device 30 as a hash value after rewriting in an associated relationship with the flow information included in the DestPhyPortSet packet into the specified individual table. The changing instruction transmission unit 212 registers, into the specified individual table, the port number included in the DestPhyPortSet packet as a port number after change in an associated relationship with the flow information included in the DestPhyPortSet packet (S110). Then, the collection unit 210 executes the process indicated at S100 again.

If it is decided that header information is not received from a switch device 30 by the collection unit 210 (S100: No), then the collection unit 210 decides whether or not a use rate for each transmission port 36 is received from a switch device 30 through the management port 23 (S111). If a use rate for each transmission port 36 is received (S111: Yes), then the collection unit 210 specifies, in the statistics information table 221, an individual table corresponding to the switch device 30 of the transmission source of the use rate for each transmission port 36. Then, the collection unit 210 updates the use rate in the specified individual table with the received use rate for each transmission port 36 (S112). Then, the collection unit 210 executes the process indicated at S100 again.

Figure 10:
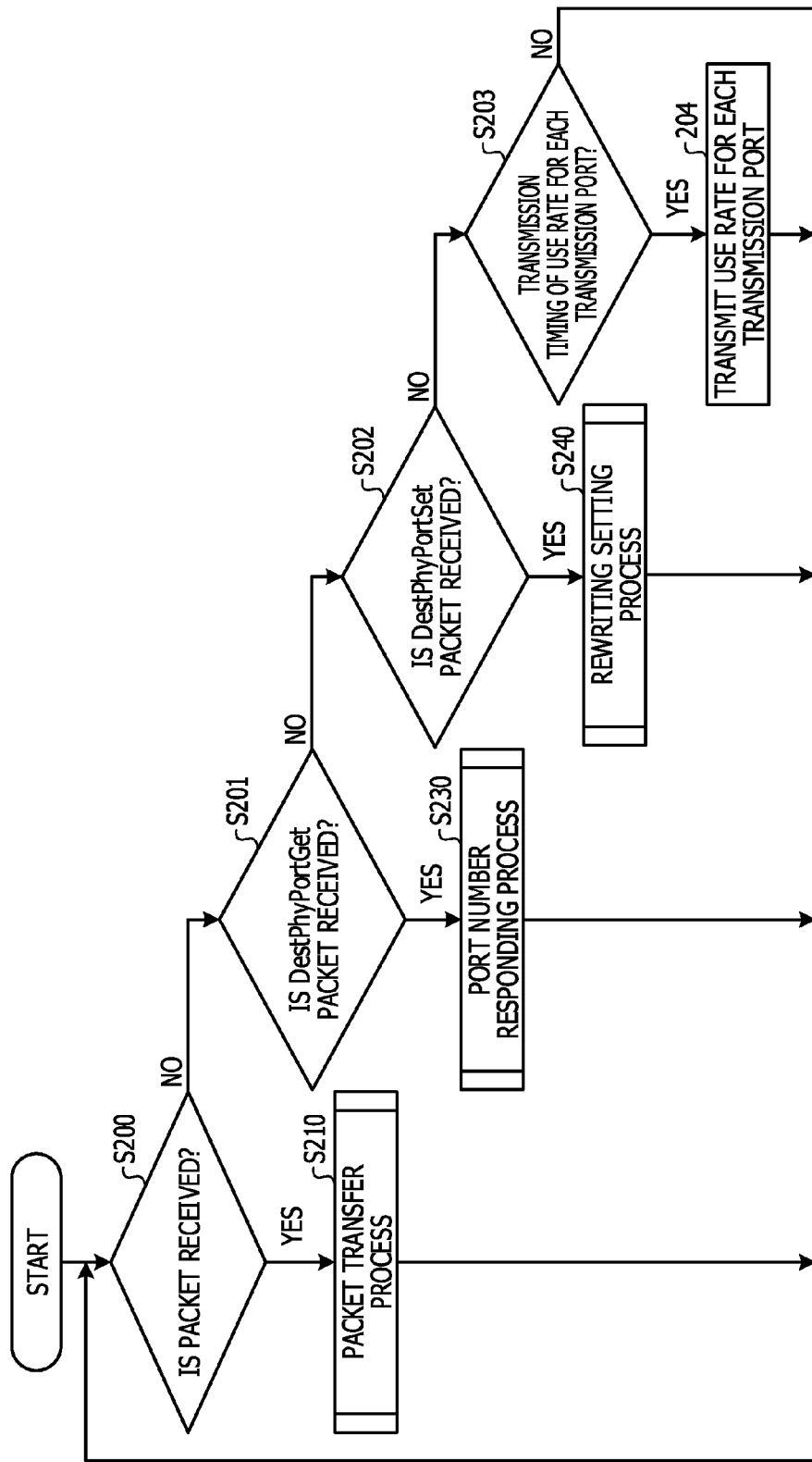
FIG. 10 is a flow chart illustrating an example of operation of a switch device in the first embodiment.

FIG. 10 is a flow chart illustrating an example of operation of a switch device in the first embodiment. The switch device described with reference to FIG. 10 may be the switch device 30 depicted in FIG. 1. Prior to execution of the flow chart depicted in FIG. 10, the monitoring condition instruction unit 312 receives a monitoring condition from the control device 20 and issues an instruction of the received monitoring condition to the header information extraction unit 331.

First, the packet reception unit 330 decides whether or not a packet is received through the reception port 34 (S200). If it is decided that a packet is received (S200: Yes), then the packet reception unit 330 transmits the received packet to the header information extraction unit 331 and the header rewriting unit 332. Then, the switch device 30 executes a packet transfer process hereinafter described (S210). Then, the packet reception unit 330 executes the process indicated at S200 again.

On the other hand, if it is decided that a packet is not received by the packet reception unit 330 (S200: No), then the port number responding unit 310 decides whether or not a DestPhyPortGet packet is received from the control device 20 through the management port 37 (S201). If it is decided that a DestPhyPortGet packet is received by the port number responding unit 310 (S201: Yes), then the switch device 30 executes a port number responding process hereinafter described (S230). Then, the packet reception unit 330 executes the process indicated at S200 again.

On the other hand, if it is decided that a DestPhyPortGet packet is not received by the port number responding unit 310 (S201: No), then the port changing unit 311 decides whether or not a DestPhyPortSet packet is received from the control device 20 through the management port 37 (S202).

If it is decided that a DestPhyPortSet packet is received by the port changing unit 311 (S202: Yes), then the switch device 30 executes a rewriting setting process hereinafter described (S240). Then, the packet reception unit 330 executes the process indicated at S200 again.

On the other hand, if it is decided that a DestPhyPortSet packet is not received by the port changing unit 311 (S202: No), then the statistics information transmission unit 313 decides whether or not the time at present is a transmission timing of a use rate for each transmission port 36 (S203). If it is decided that the time at present is not a transmission timing of a use rate for each transmission port 36 (S203: No), then the packet reception unit 330 executes the process indicated at S200 again.

On the other hand, if it is decided that the time at present is a transmission timing of a use rate for each transmission port 36 (S203: Yes), then the statistics information transmission unit 313 issues a request for a use rate for each transmission port 36 to the statistics information counter 337 and receives the use rate for each transmission port 36 from the statistics information counter 337. Then, the statistics information transmission unit 313 transmits the use rate for each transmission port 36 to the control device 20 through the management port 37 (S204). Then, the packet reception unit 330 executes the process indicated at S200 again.

Figure 11:
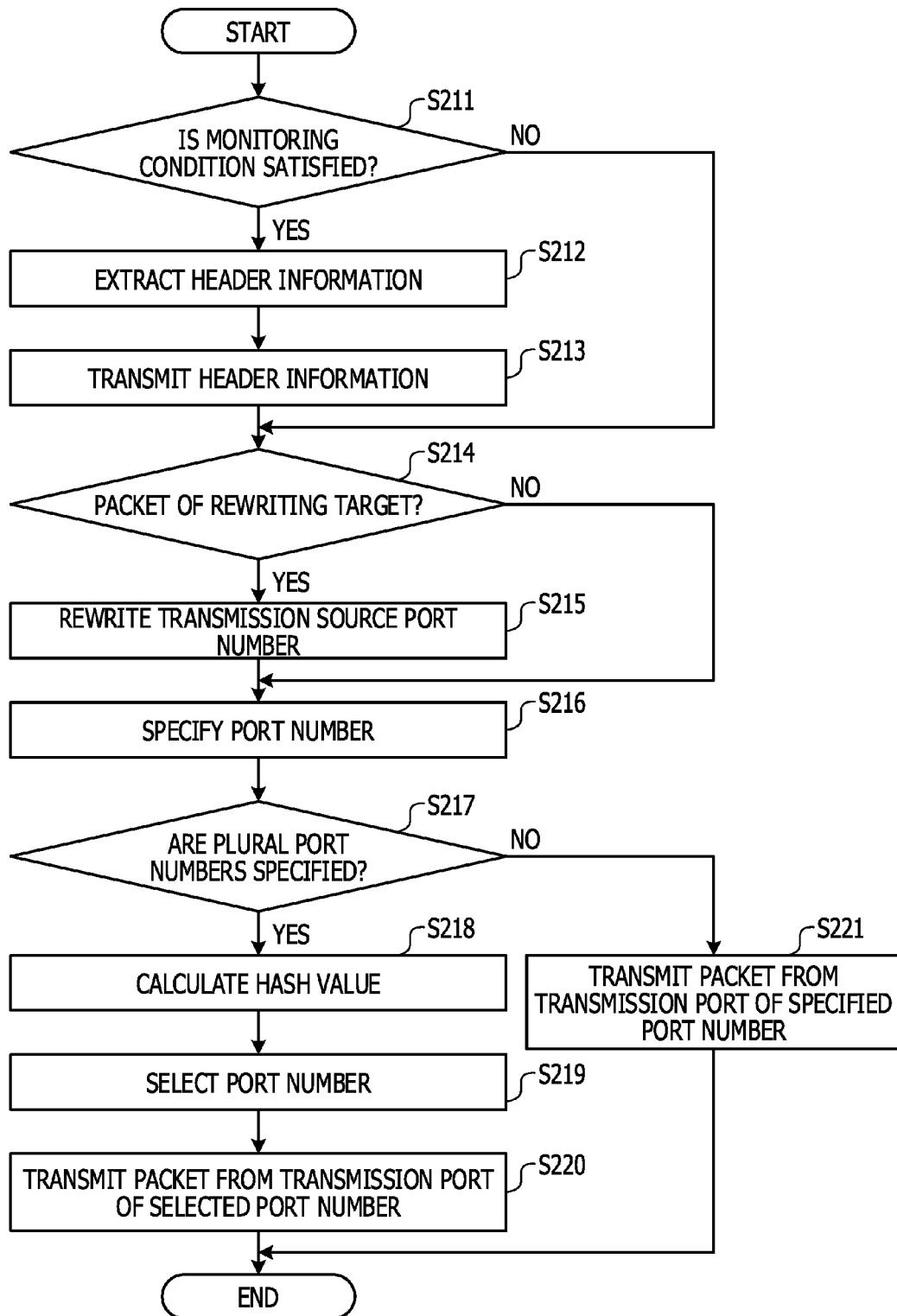
FIG. 11 is a flow chart illustrating an example of a packet transfer process in the first embodiment.

FIG. 11 is a flow chart illustrating an example of a packet transfer process in the first embodiment.

First, the header information extraction unit 331 decides whether or not a packet received from the packet reception unit 330 satisfies a monitoring condition designated from the controller 31 (S211). If it is decided that the packet received from the packet reception unit 330 does not satisfy the monitoring condition (S211: No), then the header rewriting unit 332 executes a process indicated at S214.

On the other hand, if it is decided that the packet received from the packet reception unit 330 satisfies the monitoring condition (S211: Yes), then the header information extraction unit 331 extracts header information from the packet received from the packet reception unit 330 (S212). Then, the header information extraction unit 331 transmits the extracted header information to the header information transmission unit 314. The header information transmission unit 314 transmits the header information received from the header information extraction unit 331 to the control device 20 through the management port 37 (S213).

Then, the header rewriting unit 332 extracts flow information from the header of the packet received from the packet reception unit 330. Then, the header rewriting unit 332 decides whether or not the extracted flow information is registered in the rewriting table 321 thereby to decide whether or not the packet received from the packet reception unit 330 is a packet of a rewriting target of the header (S214). If it is decided that the packet received from the packet reception unit 330 is not a packet of a rewriting target of the header (S214: No), then the header rewriting unit 332 transmits the packet received from the packet reception unit 330 to the port specification unit 333 without rewriting the header. Then, the port specification unit 333 executes a process indicated at S216.

On the other hand, if it is decided that the packet received from the packet reception unit 330 is a packet of a rewriting target of the header (S214: Yes), then the header rewriting unit 332 acquires a hash value registered in the rewriting table 321 in an associated relationship with the flow information extracted from the header. Then, the header rewriting unit 332 rewrites the transmission source port number in the header of the packet received from the packet reception unit 330 with the acquired hash value (S215). Then, the header rewriting unit 332 transmits the packet, of which the transmission source port number in the header is rewritten, to the port specification unit 333.

Then, the port specification unit 333 refers to the FDB 334 to specify a port number associated with the destination MAC address in the header of the packet received from the header rewriting unit 332 (S216). Then, the port specification unit 333 transmits the specified port number to the hash calculation unit 335 together with the packet received from the header rewriting unit 332.

Then, the hash calculation unit 335 decides whether or not a plurality of port numbers are specified by the port specification unit 333 (S217). If it is decided that a plurality of port numbers are specified by the port specification unit 333 (S217: Yes), then the hash calculation unit 335 calculates a hash value using the flow information in the header of the packet received from the port specification unit 333 (S218). Then, the hash calculation unit 335 transmits the calculated hash value to the port selection unit 336 together with the plurality of port numbers and the packet received from the port specification unit 333.

Then, the port selection unit 336 selects one of the plurality of port numbers received from the hash calculation unit 335 based on the hash value received from the hash calculation unit 335 (S219). Then, the port selection unit 336 stores the packet received from the hash calculation unit 335 into the transmission queue 35 coupled to the transmission port 36 corresponding to the selected port number. The transmission queue 35 transmits the stored packet from the transmission port 36 coupled to the transmission queue 35 (S220).

On the other hand, if it is decided that a single port number is specified by the port specification unit 333 (S217: No), then the hash calculation unit 335 transmits the port number and the packet received from the port specification unit 333 to the port selection unit 336. The port selection unit 336 stores the packet received from the hash calculation unit 335 into the transmission queue 35 coupled to the transmission port 36 corresponding to the port number specified by the port specification unit 333. The transmission queue 35 transmits the stored packet from the transmission port 36 coupled to the transmission queue 35 (S221).

Figure 12:
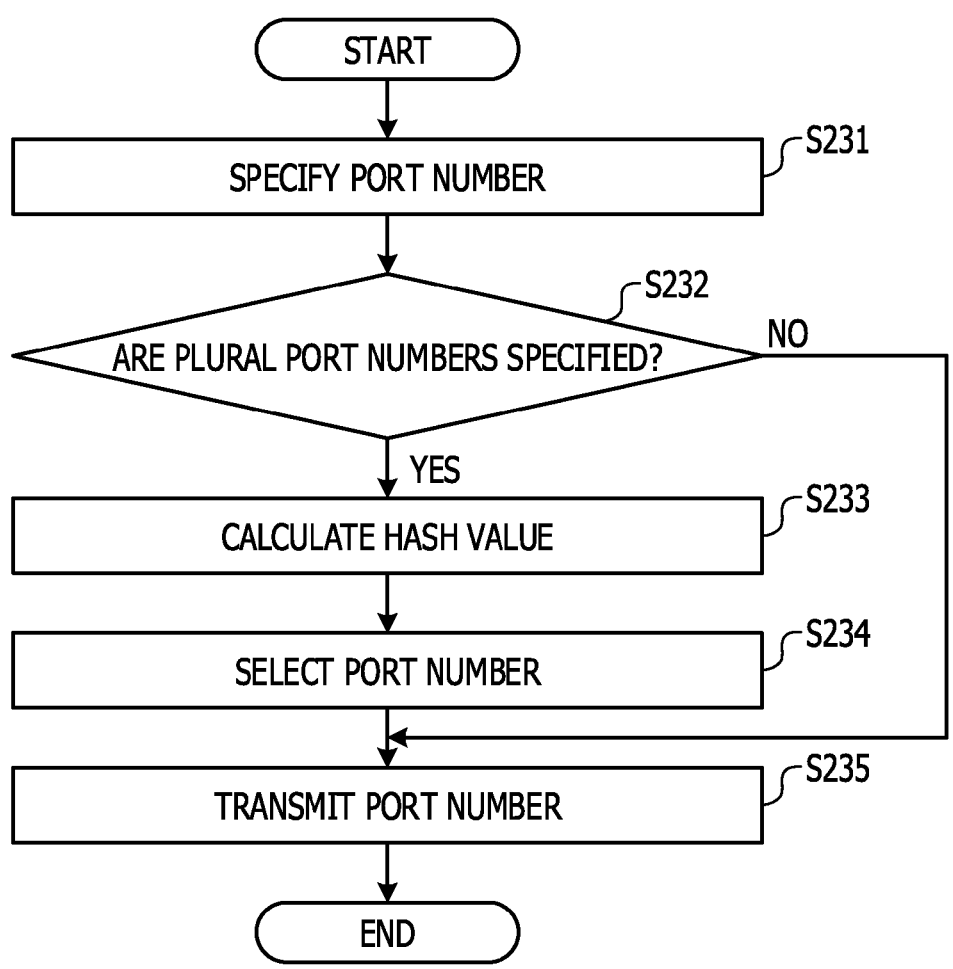
FIG. 12 is a flow chart illustrating an example of a port number responding process.

FIG. 12 is a flow chart illustrating an example of a port number responding process.

First, the port number responding unit 310 transmits a destination MAC address included in a DestPhyPortGet packet received from the control device 20 through the management port 37 to the port specification unit 333. The port specification unit 333 refers to the FDB 334 to specify a port number associated with the destination MAC address received from the port number responding unit 310 (S231). Then, the port specification unit 333 transmits the specified port number to the port number responding unit 310.

The port number responding unit 310 decides whether or not a plurality of port numbers are specified by the port specification unit 333 (S232). If it is decided that a single port number is specified by the port specification unit 333 (S232: No), then the port number responding unit 310 transmits the port number received from the port specification unit 333 to the control device 20 through the management port 37 (S235).

On the other hand, if it is decided that a plurality of port numbers are specified by the port specification unit 333 (S232: Yes), then the port number responding unit 310 transmits the flow information included in the DestPhyPortGet packet received from the control device 20 to the hash calculation unit 335. The hash calculation unit 335 calculates a hash value using the flow information received from the port number responding unit 310 (S233). Then, the hash calculation unit 335 transmits the calculated hash value to the port number responding unit 310.

Thereafter, the port number responding unit 310 transmits the hash value received from the hash calculation unit 335 to the port selection unit 336 together with the plurality of port numbers received from the port specification unit 333. The port selection unit 336 selects one of the plurality of port numbers received from the port number responding unit 310 based on the hash value received from the port number responding unit 310 (S234). Then, the port selection unit 336 transmits the selected port number to the port number responding unit 310. The port number responding unit 310 executes the process indicated at S235.

Figure 13:
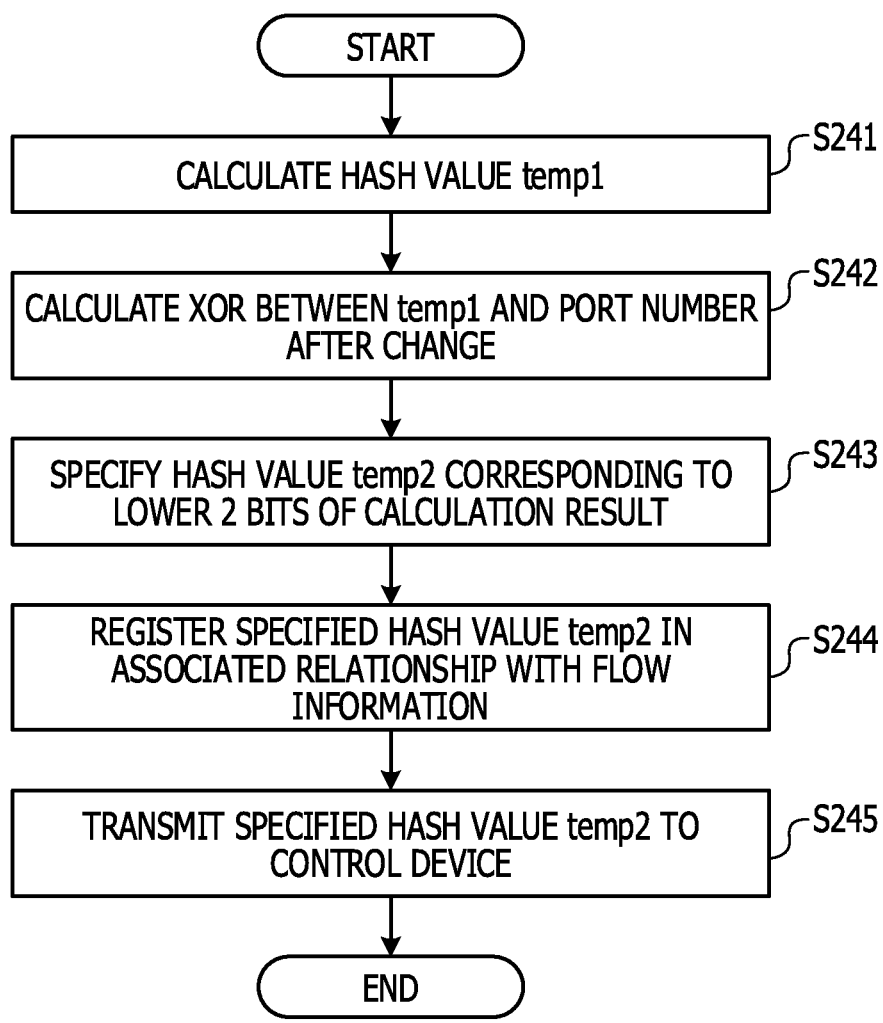
FIG. 13 is a flow chart illustrating an example of a rewriting setting process in the first embodiment.

FIG. 13 is a flow chart illustrating an example of a rewriting setting process in the first embodiment.

First, the port changing unit 311 extracts, from within flow information included in a DestPhyPortSet packet received from the control device 20 through the management port 37, a transmission source IP address, a destination IP address, a destination port number and a protocol number. Then, the port changing unit 311 transmits the extracted transmission source IP address, destination IP address, destination port number and protocol number to the hash calculation unit 335. The hash calculation unit 335 calculates a hash value temp1 described hereinabove using the transmission source IP address, destination IP address, destination port number and protocol number received from the port changing unit 311 (S241). Then, the hash calculation unit 335 transmits the calculated hash value temp1 to the port changing unit 311.

Then, the port changing unit 311 calculates an XOR between the port number of the transmission port 36 after change included in the DestPhyPortSet packet received from the control device 20 and the hash value temp1 received from the hash calculation unit 335 (S242). Then, the port changing unit 311 refers to the hash table 320 to specify one hash value from among a plurality of hash values associated with an index of a value equal to the value of the lower two bits of a result of the XOR calculation as a hash value temp2 (S243). Then, the port changing unit 311 registers the specified hash value temp2 in an associated relationship with the flow information included in the DestPhyPortSet packet into the rewriting table 321 (S244). Then, the port changing unit 311 transmits the hash value temp2 registered in the rewriting table 321 as a response to the DestPhyPortSet packet to the control device 20 through the management port 37 (S245).

As described above, the control device 20 of the present embodiment collects header information of sampled packets and manages information of flows including packets in an associated relationship with port numbers of transmission ports from which a packet is to be transmitted. Then, when the transmission port from which a packet included in a flow is to be transmitted is to be changed, the control device 20 designates information of the flow and the port number of the transmission port after change and notifies the switch device 30. The switch device 30 calculates a hash value to be set to the transmission source port number in the header such that the port number designated from the control device 20 is selected as the port number of the transmission port from which the packet included in the flow designated from the control device 20 is to be transmitted. Then, when a packet included in the flow designated from the control device 20 is received, the switch device 30 rewrites the transmission source port number of the received packet with the calculated hash value. Consequently, the flow including the packet included in the flow designated from the control device 20 is transmitted from the transmission port corresponding to the port number after change designated from the control device 20. Consequently, the control device 20 can perform precise management of transmission paths of flows.

[Second Embodiment]

The header information extraction unit 331 in the first embodiment extracts header information of a packet received by the packet reception unit 330 every given time interval or for every given number of packets. In contrast, the header information extraction unit 331 in the present embodiment is different in that the header information extraction unit 331 decides whether or not header information of a packet is to be extracted in response to an attribute of an encapsulated original packet from among packets received by the packet reception unit 330.

The header information extraction unit 331 in the present embodiment extracts, if an encapsulated original packet is a packet used for communication of the connection type such as a transmission control protocol (TCP) and indicates establishment or release of a connection, header information of the packet. If the encapsulated original packet is used for communication of the connectionless type such as UDP, then the header information extraction unit 331 extracts header information of a packet received by the packet reception unit 330 every given time interval or for every given number of packets similarly as in the first embodiment.

Since an information processing system 10, a control device 20 and a switch device 30 in the present embodiment are similar to the information processing system 10, control device 20, switch device 30 in the first embodiment described hereinabove with reference to FIGS. 1 to 8, respectively, detailed description of them is omitted herein. Further, operation of the switch device 30 in the present embodiment is similar to the operation of the switch device 30 in the first embodiment described hereinabove with reference to FIG. 10, and therefore, detailed description of the operation is omitted herein. A port number responding process of the switch device 30 in the present embodiment is similar to the port number responding process of the switch device 30 in the first embodiment described hereinabove with reference to FIG. 12, and therefore, detailed description of the process is omitted herein. A rewriting setting process of the switch device 30 in the present embodiment is similar to the rewriting setting process of the switch device 30 in the first embodiment described hereinabove with reference to FIG. 13, and therefore, detailed description of the process is omitted herein.

Figure 14:
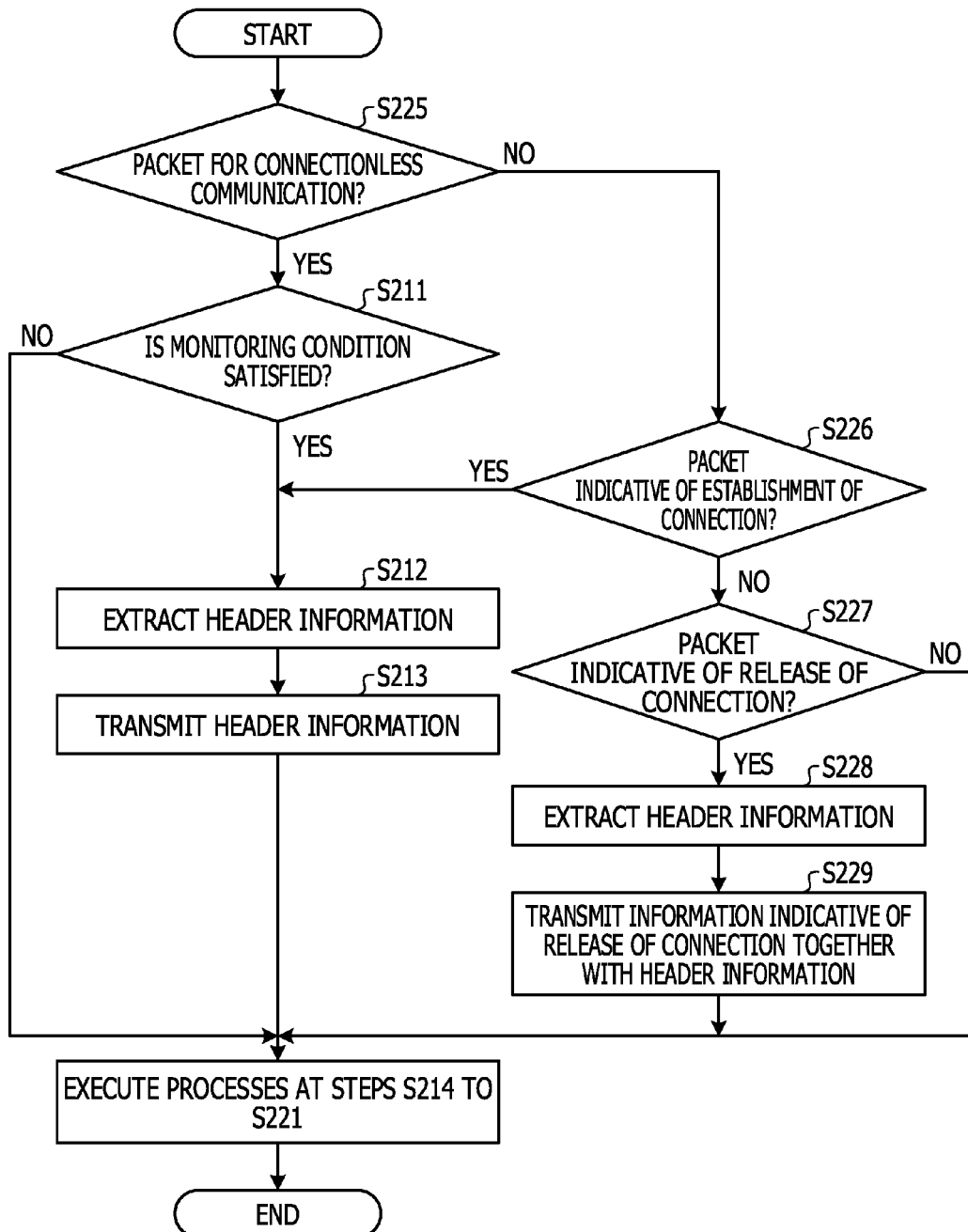
FIG. 14 is a flow chart illustrating an example of a packet transfer process in a second embodiment.

FIG. 14 is a flow chart illustrating an example of a packet transfer process in the second embodiment. The packet transfer process of the switch device 30 in the present embodiment is similar to the packet transfer process of the switch device 30 in the first embodiment described hereinabove with reference to FIG. 11 except matters described below. Therefore, in the following, principally differences from the packet transfer process in the first embodiment are described.

First, the header information extraction unit 331 extracts the header of an encapsulated original packet from a packet received from the packet reception unit 330. Then, the header information extraction unit 331 refers to a protocol number in the extracted header to decide whether or not the original packet is a packet to be used for communication of the connectionless type (S225). If it is decided that the original packet is a packet to be used for communication of the connectionless type (S225: Yes), then the header information extraction unit 331 decides whether or not the packet received from the packet reception unit 330 satisfies a monitoring condition (S211).

If it is decided that the packet received from the packet reception unit 330 does not satisfy the monitoring condition (S211: No), then the header rewriting unit 332 executes the process indicated at S214 of FIG. 11. On the other hand, if it is decided that the packet received from the packet reception unit 330 satisfies the monitoring condition (S211: Yes), then the header information extraction unit 331 extracts header information from the packet received from the packet reception unit 330 (S212). Then, the header information extraction unit 331 transmits the extracted header information to the header information transmission unit 314. The header information transmission unit 314 transmits the header information received from the header information extraction unit 331 to the control device 20 through the management port 37 (S213). Then, the switch device 30 executes the processes at S214 to S221 described hereinabove with reference to FIG. 11.

On the other hand, if it is decided that the original packet is a packet to be used for communication of the connection type (S225: No), then the header information extraction unit 331 refers to a control flag included in the header of the original packet. Then, the header information extraction unit 331 decides whether or not the original packet is a packet indicative of establishment of connection (S226). The header information extraction unit 331 decides whether or not the original packet is a packet indicative of establishment of connection, for example, by deciding whether or not a synchronize (SYN) bit and an acknowledgement (ACK) bit in the control flag are 1. If it is decided that the original packet is a packet indicative of establishment of connection (S226: Yes), then the header information extraction unit 331 executes the process indicated at S212.

On the other hand, if it is decided that the original packet is not a packet indicative of establishment of connection (S226: No), then the header information extraction unit 331 decides whether or not the original packet is a packet indicative of release of connection (S227). The header information extraction unit 331 decides whether or not the original packet is a packet indicative of release of connection, for example, by deciding whether or not a finish (FIN) bit and the ACK bit in the control flag are 1. If it is decided that the original packet is not a packet indicative of release of connection (S227: No), then the switch device 30 executes the processes at S214 to S221 described hereinabove with reference to FIG. 11.

On the other hand, if it is decided that the original packet is a packet indicative of release of connection (S227: Yes), then the header information extraction unit 331 extracts the header information of the packet received from the packet reception unit 330 (S228). Then, the header information extraction unit 331 transmits the information indicative of release of connection to the header information transmission unit 314 together with the extracted header information. The header information transmission unit 314 transmits the information indicative of release of connection received from the header information extraction unit 331 to the control device 20 through the management port 37 together with the header information received from the header information extraction unit 331 (S229). Then, the switch device 30 executes the processes at S214 to S221 described hereinabove with reference to FIG. 11.

Figure 15:
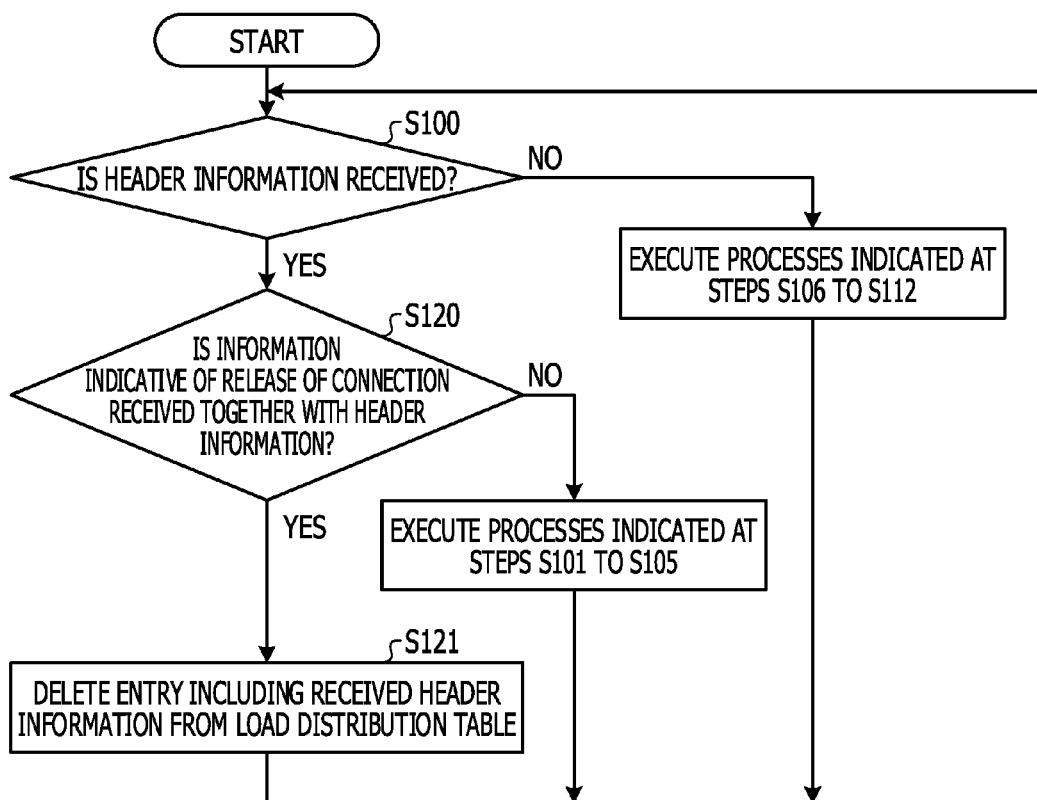
FIG. 15 is a flow chart illustrating an example of operation of a control device in the second embodiment.

FIG. 15 is a flow chart illustrating an example of operation of the control device 20 in the second embodiment. Operation of the control device 20 in the present embodiment is similar to the operation of the control device 20 in the first embodiment described hereinabove with reference to FIG. 9 except matters described below. Therefore, in the following, principally differences from the operation of the control device 20 in the first embodiment are described.

First, the collection unit 210 decides whether or not header information is received from a switch device 30 through the management port 23 (S100). If it is decided that header information is not received from a switch device 30 by the collection unit 210 (S100: No), then the control device 20 executes the processes at S106 to S112 described hereinabove with reference to FIG. 9.

On the other hand, if it is decided that header information is received from a switch device 30 (S100: Yes), then the collection unit 210 decides whether or not information indicative of release of connection is received together with the header information (S120). If it is decided that information indicative of release of connection is not received (S120: No), then the control device 20 executes the processes at S101 to S105 described hereinabove with reference to FIG. 9.

On the other hand, if it is decided that information indicative of release of connection is received together with the header information (S120: Yes), then the collection unit 210 extracts flow information from the received header information. Then, the collection unit 210 specifies an individual table corresponding to the switch device 30 of the transmission source of the header information from within the load distribution table 220. Then, the collection unit 210 deletes an entry including the flow information extracted from the received header information from the specified individual table (S121). Then, the collection unit 210 executes the process indicated at S100 again.

As described hereinabove, the switch device 30 in the present embodiment extracts the header information of the packet and transmits the extracted header information to the control device 20 if the encapsulated original packet is a packet to be used for communication of the connection type and besides is a packet indicative of establishment of connection. Consequently, the control device 20 can register information relating to a flow that performs communication of the connection type into the load distribution table 220 at a timing at which the connection is established.

The switch device 30 in the present embodiment transmits information indicative of release of connection to the control device 20 together with the extracted header information when the original packet is a packet to be used for communication of the connection type and besides is a packet indicative of release of connection. Consequently, the control device 20 can delete information of the flow whose connection is released from the load distribution table 220 where the flow involves communication of the connection type. Consequently, increase of the data amount in the storage unit 22 can be suppressed.

The switch device 30 in the present embodiment extracts header information of packets indicative of establishment or release of connection and transmits the extracted header information to the control device 20 when the original packet is a packet to be used for communication of the connection type. Consequently, when the original packet is a packet to be used for communication of the connection type, the switch device 30 does not transmit header information of packets other than the packets indicative of establishment or release of connection to the control device 20. Therefore, increase of the communication traffic involved in transmission of header information can be suppressed.

[Third Embodiment]

In the present embodiment, when a transmission source port number in a header of a packet is to be rewritten, a switch device 30 coupled to a communication device 14 of the transmission source of the packet rewrites the transmission source port number in the header of the packet. Then, a switch device 30 coupled to a communication device 14 of a destination of the packet writes back a transmission source port number in the rewritten header (restores an original hash value). The information processing system 10 in the present embodiment is similar to the information processing system 10 in the first embodiment described hereinabove with reference to FIG. 1, and therefore, detailed description is omitted herein.

Figure 16:
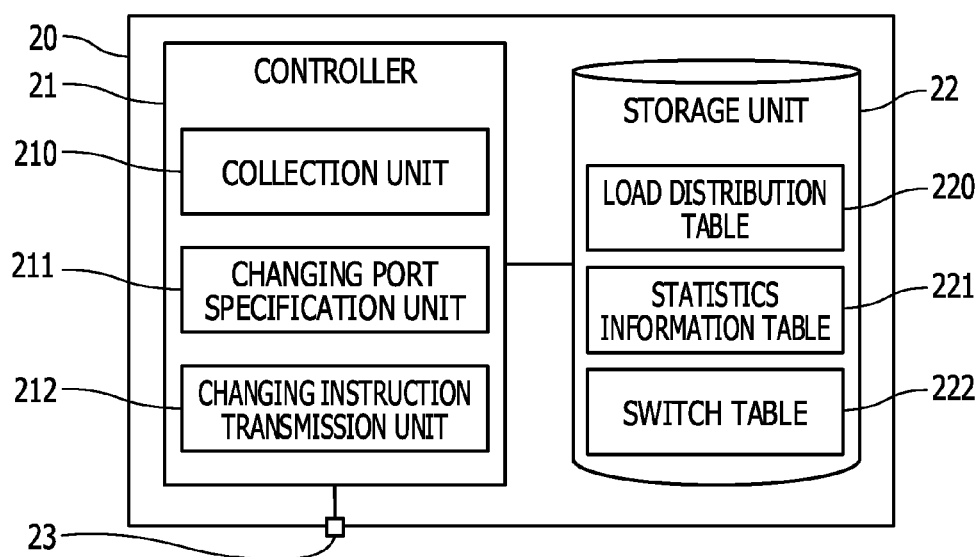
FIG. 16 is a block diagram depicting an example of a control device in a third embodiment.

FIG. 16 is a block diagram depicting an example of a control device in the third embodiment. A control device 20 includes a controller 21, a storage unit 22 and a management port 23. The controller 21 includes a collection unit 210, a changing port specification unit 211 and a changing instruction transmission unit 212. The storage unit 22 in the present embodiment includes a load distribution table 220, a statistics information table 221 and a switch table 222. Except matters described below, blocks depicted in FIG. 16 and denoted by reference symbols same as the reference symbols in FIG. 3 are same or similar to the blocks in FIG. 3, and therefore, description is omitted herein.

Figure 17:
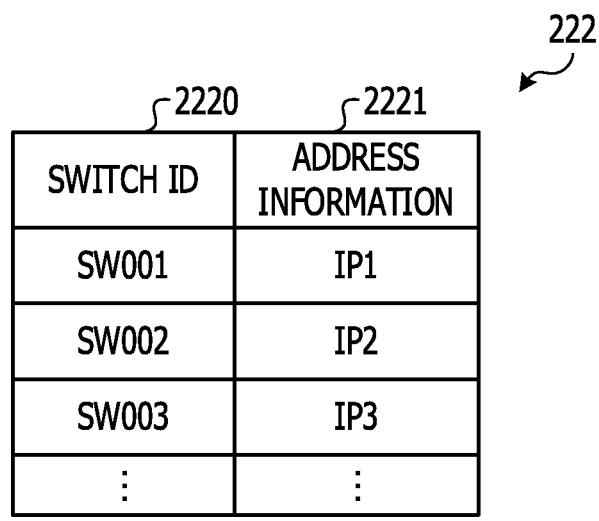
FIG. 17 is a view depicting an example of a switch table.

FIG. 17 is a view depicting an example of a switch table. The switch table depicted in FIG. 17 may be the switch table 222 depicted in FIG. 16. In the switch table 222, address information 2221 of switch devices 30 is stored in an associated relationship with switch IDs 2220 for identifying the individual switch devices 30. In the present embodiment, the address information 2221 is IP addresses of the switch devices 30.

Here, a terminating device of a logical channel provided in each of the communication devices 14 sets a hash value calculated using a header of an original packet transmitted from a virtual server to a transmission source port number in a header of a packet encapsulated from the original packet. If a switch device 30 on a transmission path of a packet does not rewrite the transmission source port number in the header, then the transmission source port number in the header of the packet received by the communication device 14 of the destination has an equal value to the transmission source port number in the header of the packet transmitted from the communication device 14 of the transmission source.

However, if the switch device 30 on the transmission path of the packet rewrites the transmission source port number in the header in accordance with an instruction from the control device 20, then the transmission source port number in the header of the packet received by the communication device 14 of the destination has a value different from the value of the transmission source port number in the header of the packet transmitted from the communication device 14 of the transmission source. As regards packets that flow in the network, preferably a packet same as a packet transmitted from a device at the transmission side is received by a device at the reception side. This makes it possible to perform detection of alteration in the network and damage to data and so forth.

Therefore, in the present embodiment, the switch device 30 coupled to the communication device 14 of the transmission source rewrites the transmission source port number in the header, and the switch device 30 coupled to the communication device 14 of the destination restores the transmission source port number from the transmission source port number in the rewritten header. Consequently, a packet same as the packet transmitted from the communication device 14 of the transmission source is received by the communication device 14 of the destination. In the following description, the switch device 30 that rewrites the transmission source port number in the header is referred to as first switch device 30, and the switch device 30 that restores the transmission source port number from the transmission source port number in the rewritten header is referred to as second switch device 30.

The changing port specification unit 211 in the present embodiment refers to the load distribution table 220 and the statistics information table 221 in the storage unit 22 to specify a flow whose transmission port 36 is to be changed. Then, the changing port specification unit 211 specifies a first switch device 30 that issues an instruction to change a transmission port 36 and a second switch device 30 that issues an instruction to return the transmission port to an original transmission port in the designated flow. The control device 20 retains information regarding the topology of the information processing system 10, and the changing port specification unit 211 refers, for example, to the information regarding the topology to specify the first switch device 30 and the second switch device 30 on the transmission path of the flow. Then, the changing port specification unit 211 transmits flow information of the flow whose transmission port 36 is to be changed, the port number of the transmission port 36 after the change, the switch ID of the first switch device 30 and the switch ID of the second switch device 30 to the changing instruction transmission unit 212.

If the changing instruction transmission unit 212 receives the flow information, port number of the transmission port 36, switch ID of the first switch device 30 and switch ID of the second switch device 30 from the changing port specification unit 211, then the changing instruction transmission unit 212 acquires address information of the second switch device 30 from the switch table 222. Then, the changing instruction transmission unit 212 generates a DestPhyPortSet packet including the flow information and the port number received from the changing port specification unit 211 and the address information of the second switch device 30 acquired from the switch table 222. Then, the changing instruction transmission unit 212 transmits the generated DestPhyPortSet packet to the first switch device 30 through the management port 23.

Figure 18:
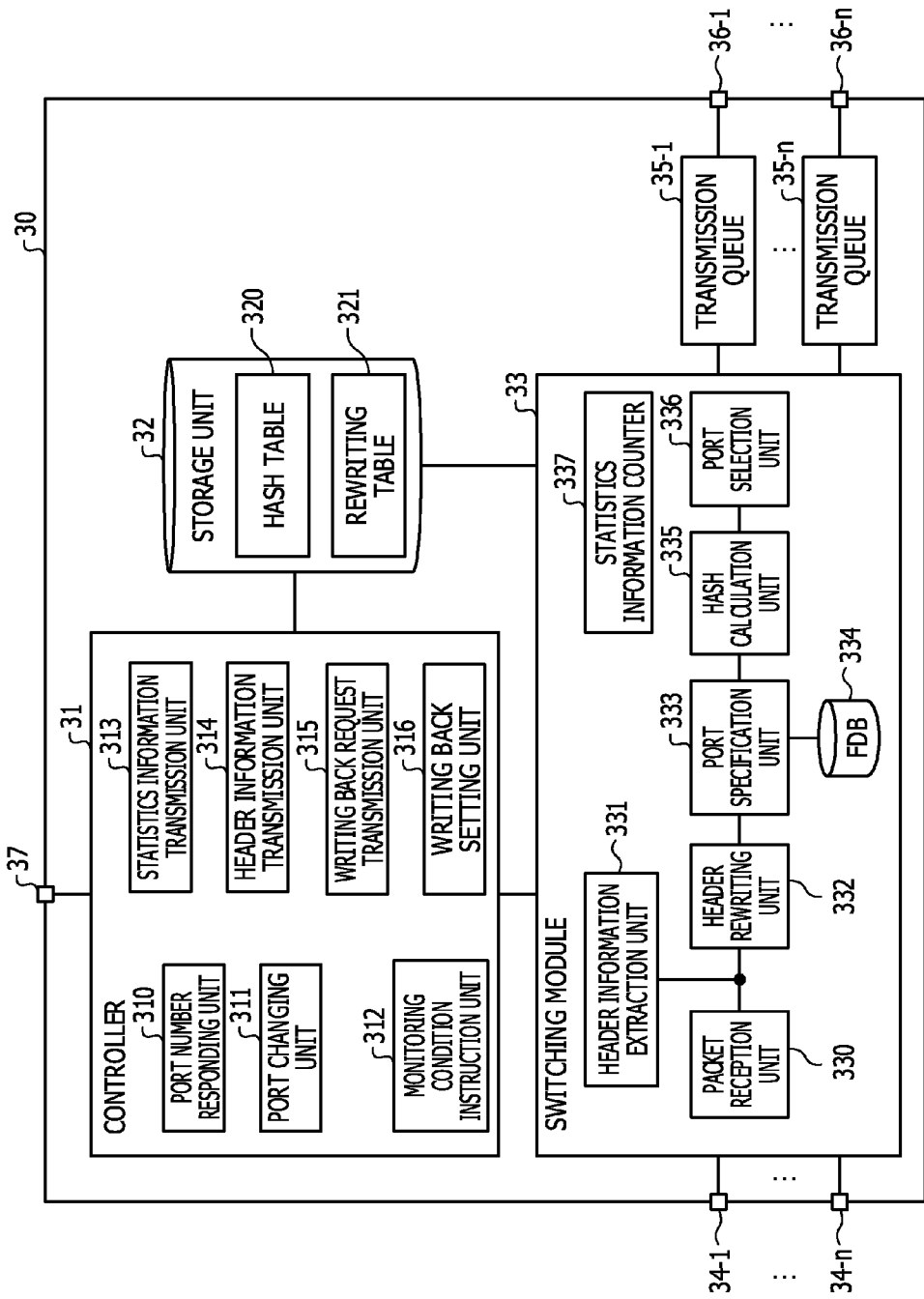
FIG. 18 is a block diagram depicting an example of a switch device in the third embodiment.

FIG. 18 is a block diagram depicting an example of the switch device 30 in the third embodiment. The switch device 30 includes a controller 31, a storage unit 32, a switching module 33, a plurality of reception ports 34-1 to 34-8, a plurality of transmission queues 35-1 to 35-8, a plurality of transmission ports 36-1 to 36-8, and a management port 37. The controller 31 in the present embodiment includes a port number responding unit 310, a port changing unit 311, a monitoring condition instruction unit 312, a statistics information transmission unit 313, a header information transmission unit 314, a writing back request transmission unit 315 and a writing back setting unit 316. Except matters described below, blocks depicted in FIG. 18 and denoted by reference symbols same as the reference symbols in FIG. 6 are same or similar to the blocks in FIG. 6, and therefore, description thereof is omitted herein.

The port changing unit 311 specifies, when a DestPhyPortSet packet is received from the control device 20 through the management port 37, a hash value temp2 to be replaced with the transmission source port number in the header of the packet, and registers the specified hash value temp2 into the rewriting table 321. Then, the port changing unit 311 transmits the hash value temp2 registered in the rewriting table 321 to the control device 20 through the management port 37. Then, the port changing unit 311 transmits the DestPhyPortSet packet received from the control device 20 and the specified hash value temp2 to the writing back request transmission unit 315.

Figure 19:
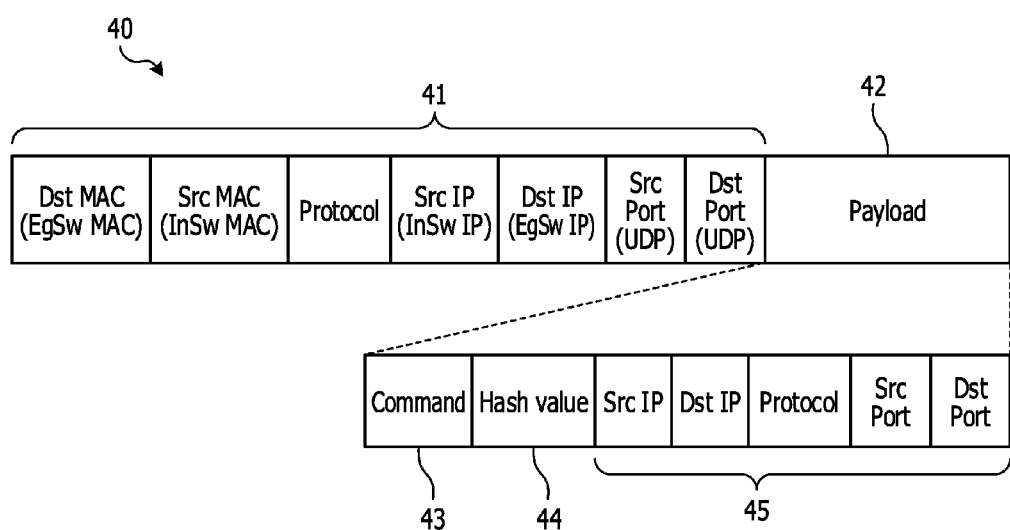
FIG. 19 is a view depicting an example of a format of a writing back requesting packet.

The writing back request transmission unit 315 extracts, when a DestPhyPortSet packet and a hash value temp2 are received from the port changing unit 311, the flow information and the address information of the second switch device 30 from the DestPhyPortSet packet. Then, the writing back request transmission unit 315 generates a writing back requesting packet 40, for example, depicted in FIG. 19. FIG. 19 is a view depicting an example of a format of the writing back requesting packet 40. The writing back requesting packet 40 includes a header 41 and a payload 42.

In a destination MAC address (Dst MAC) in the header 41, a MAC address of the second switch device 30 is stored. In a transmission source MAC address (Src MAC) in the header 41, a MAC address of the first switch device 30 is stored. In a protocol number (Protocol) in the header 41, a protocol number of the UDP is stored. In a transmission source IP address (Src IP) in the header 41, an IP address of the first switch device 30 is stored. In a destination IP address (Dst IP) in the header 41, an IP address of the second switch device 30 is stored. In a transmission source port number (Src Port) in the header 41, a hash value hereinafter described is stored. In a destination port number (Dst Port) in the header 41, a UDP port number of the second switch device 30 is stored.

The payload 42 includes Command 43, Hash value 44 and flow information 45. In the Command 43, information indicative of a rewriting request is stored. In the Hash value 44, a transmission source port number included in the flow information extracted from the DestPhyPortSet packet is stored. In the flow information 45, a transmission source IP address, a destination IP address, a protocol number, a transmission source port number and a destination port number are stored. In the flow information 45, a hash value received from the port changing unit 311 is stored as the transmission source port number. In other words, in the Hash value 44, a different transmission source port number to be rewritten by the header rewriting unit 332 is stored, and in the flow information 45, flow information including the transmission source port number after rewriting by the header rewriting unit 332 is stored.

Here, a calculation procedure of a hash value to be stored into the transmission source port number (Src Port) in the header 41 is described. The writing back request transmission unit 315 specifies a transmission source IP address, a destination IP address, a destination port number and a protocol number to be stored into the header 41 of the writing back requesting packet 40. Then, the writing back request transmission unit 315 transmits the specified transmission source IP address, destination IP address, destination port number and protocol number to the hash calculation unit 335. Then, the writing back request transmission unit 315 receives a hash value temp1' from the hash calculation unit 335.

Then, the writing back request transmission unit 315 calculates an XOR between the port number of the transmission port 36 after change included in the DestPhyPortSet packet received from the port changing unit 311 and the hash value temp1' received from the hash calculation unit 335.

Then, the writing back request transmission unit 315 refers to the hash table 320 to specify one of a plurality of hash values associated with an index of a value equal to the value of the lower two bits of a result of the XOR calculation as a hash value temp2'. Then, the writing back request transmission unit 315 stores the specified hash value temp2' into the transmission source port number (Src Port) in the header 41. Then, the writing back request transmission unit 315 generates a writing back requesting packet 40 and transmits the generated writing back requesting packet 40 to the port specification unit 333.

The port specification unit 333 specifies the port number of the transmission port 36 based on the destination MAC address of the writing back requesting packet 40 received from the writing back request transmission unit 315. The hash calculation unit 335 calculates a hash value when port numbers of a plurality of transmission ports 36 are specified by the port specification unit 333. The port selection unit 336 selects one of the transmission ports 36, from which the writing back requesting packet 40 is to be transmitted, based on the hash value calculated by the hash calculation unit 335. Then, the port selection unit 336 stores the writing back requesting packet 40 into the transmission queue 35 coupled to the selected transmission port 36. Consequently, the writing back requesting packet 40 is transmitted from the transmission port 36 selected by the port selection unit 336.

In this manner, the writing back request transmission unit 315 causes the hash calculation unit 335 to calculate a hash value temp1' using the transmission source IP address, destination IP address, destination port number and protocol number in the header 41 of the writing back requesting packet 40. Then, the writing back request transmission unit 315 specifies a hash value temp2' corresponding to the lower two bits of a result of the XOR calculation between the hash value temp1' calculated by the hash calculation unit 335 and the port number of the transmission port 36 after change included in the DestPhyPortSet packet. Then, the writing back request transmission unit 315 stores the specified hash value temp2' into the transmission source port number in the header 41. Consequently, the writing back requesting packet 40 is transmitted from the transmission port 36 that is same as the transmission port 36 from which the packet included in the flow when the transmission port 36 is changed is to be transmitted to the second switch device 30. Consequently, control for suppression of the deviation of the traffic or the like can be performed from the stage at which the writing back requesting packet 40 is transmitted.

The packet reception unit 330 transmits, when the writing back requesting packet 40 is received through the reception port 34, the received writing back requesting packet 40 to the writing back setting unit 316. The writing back setting unit 316 extracts, when the writing back requesting packet 40 is received from the packet reception unit 330, a hash value stored in the Hash value 44 and flow information stored in the flow information 45 from the payload 42. Then, the writing back setting unit 316 stores the extracted hash value in an associated relationship with the extracted flow information into the rewriting table 321. Consequently, the header rewriting unit 332 of the second switch device 30 that receives the writing back requesting packet 40 from the first switch device 30 can write back the transmission source port number in the header of the packet received from the first switch device 30 to the original value before the transmission source port number is rewritten by the header rewriting unit 332 of the first switch device 30.

Figure 20:
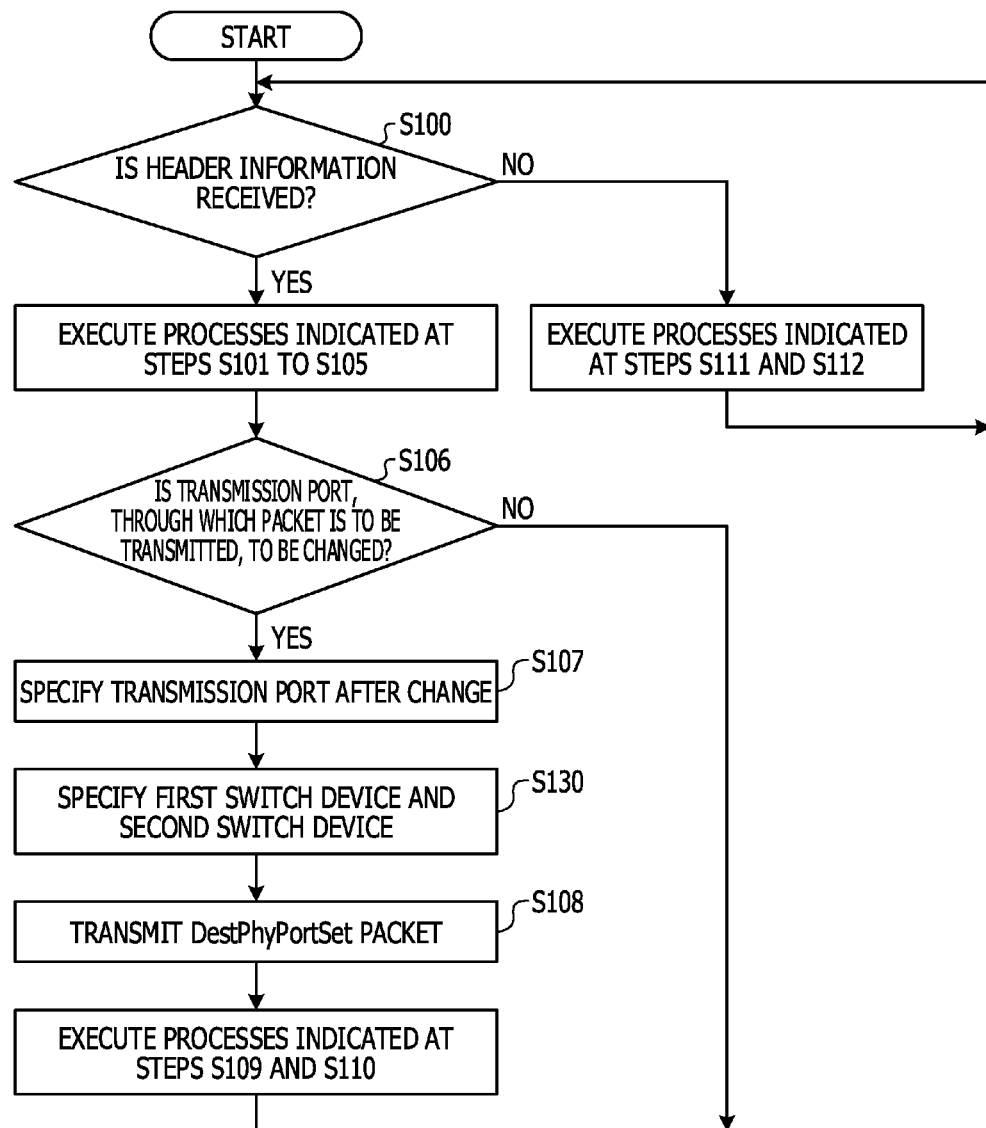
FIG. 20 is a flow chart illustrating an example of operation of a control device in the third embodiment.

FIG. 20 is a flow chart illustrating an example of operation of a control device in the third embodiment. The control device described with reference to FIG. 20 may be the control device 20 depicted in FIG. 16. Operation of the control device 20 in the present embodiment is similar to the operation of the control device 20 in the first embodiment described hereinabove with reference to FIG. 9 except matters described below. Therefore, in the following, principally differences from the operation of the control device 20 in the first embodiment are described.

First, the collection unit 210 decides whether or not header information is received from a switch device 30 through the management port 23 (S100). If it is decided that header information is not received from a switch device 30 (S100: No), then the collection unit 210 executes the processes at S111 and S112 described hereinabove with reference to FIG. 9. On the other hand, if it is decided that header information is received from a switch device 30 (S100: Yes), then the collection unit 210 executes the processes at S101 to S105 described hereinabove with reference to FIG. 9. Then, the changing port specification unit 211 decides whether or not the transmission port 36 from which a packet included in the flow is to be transmitted is to be changed (S106). If it is decided that the transmission port 36 is not to be changed (S106: No), then the collection unit 210 executes the process indicated at S100 again.

On the other hand, if it is decided that the transmission port 36 is to be changed (S106: Yes), then the changing port specification unit 211 specifies the transmission port 36 after change (S107). Then, the changing port specification unit 211 refers, for example, to the information regarding the topology of the information processing system 10 to specify the first switch device 30 and the second switch device 30 on the transmission path of the flow (S130). Then, the changing port specification unit 211 transmits the flow information of the flow whose transmission port 36 is to be changed, the port number of the transmission port 36 after change, the switch ID of the first switch device 30 and the switch ID of the second switch device 30 to the changing instruction transmission unit 212.

Then, the changing instruction transmission unit 212 acquires address information of the second switch device 30 received from the changing port specification unit 211 from the switch table 222. Then, the changing instruction transmission unit 212 generates a DestPhyPortSet packet including the flow information and the port number received from the changing port specification unit 211 and the address information of the second switch device 30 acquired from the switch table 222. Then, the changing instruction transmission unit 212 transmits the generated DestPhyPortSet packet to the first switch device 30 through the management port 23 (S108). Then, the changing instruction transmission unit 212 executes the processes at S109 and S110 described hereinabove with reference to FIG. 9.

Figure 21:
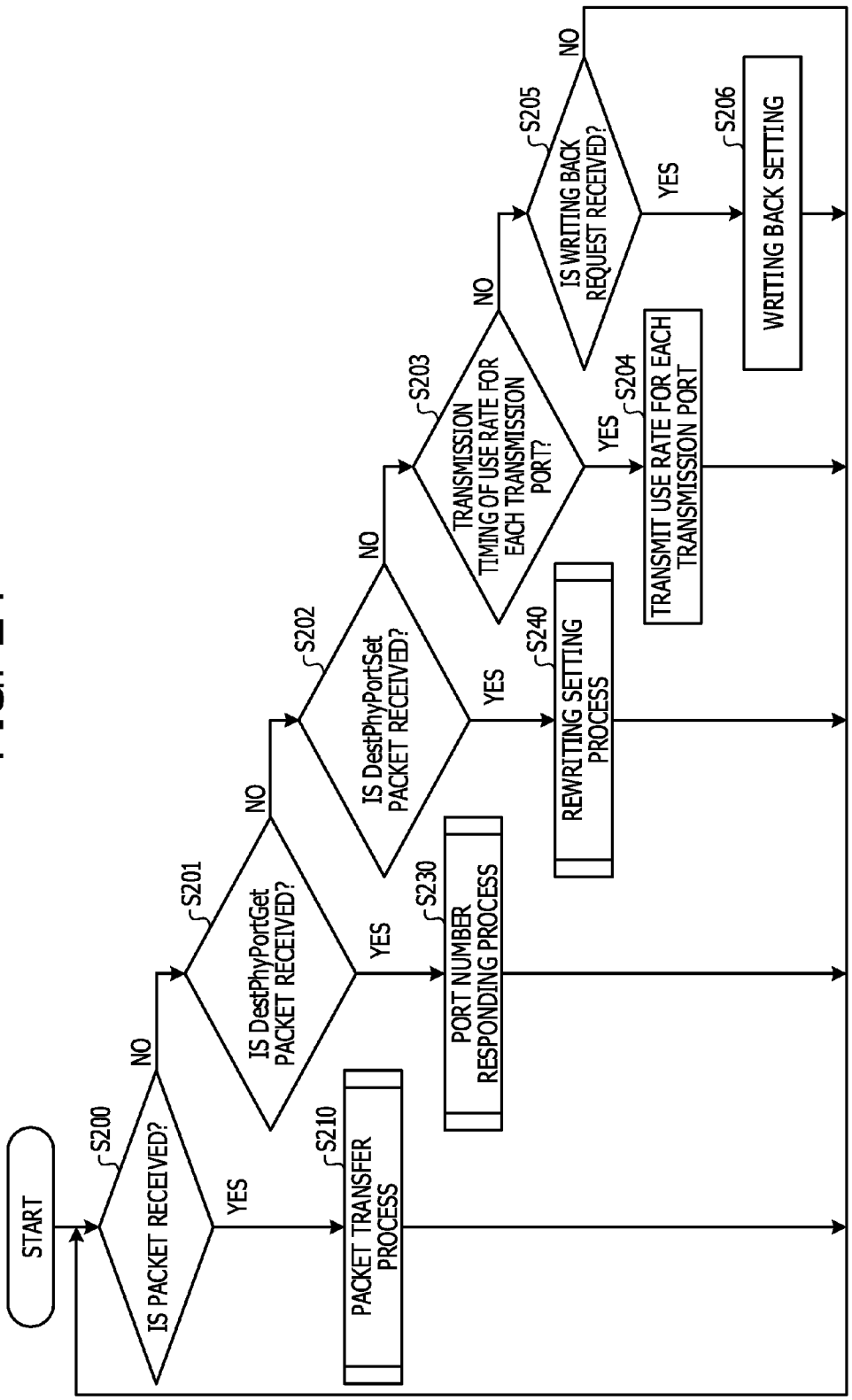
FIG. 21 is a flow chart illustrating an example of operation of a switch device in the third embodiment.

FIG. 21 is a flow chart illustrating an example of operation of a switch device in the third embodiment. The switch device described with reference to FIG. 21 may be the switch device 30 depicted in FIG. 18. Except matters described below, the operation of the switch device 30 in the present embodiment is similar to the operation of the switch device 30 in the first embodiment described hereinabove with reference to FIG. 10. Therefore, in the following, description is given principally of differences from the operation of the switch device 30 in the first embodiment.

If it is decided that the time at present is not a transmission timing of a use rate for each transmission port 36 (S203: No), then the packet reception unit 330 decides whether or not a writing back requesting packet 40 is received (S205). If it is decided that a writing back requesting packet 40 is not received by the packet reception unit 330 (S205: No), then the packet reception unit 330 executes the process indicated at S200 again.

On the other hand, if it is decided that a writing back requesting packet 40 is received by the packet reception unit 330 (S205: Yes), then the packet reception unit 330 transmits the received writing back requesting packet 40 to the writing back setting unit 316. The writing back setting unit 316 extracts, from the payload 42 in the writing back requesting packet 40 received from the packet reception unit 330, a hash value stored in the Hash value 44 and flow information stored in the flow information 45. Then, the writing back setting unit 316 stores the extracted hash value in an associated relationship with the extracted flow information into the rewriting table 321 to perform writing back setting (S206). Then, the packet reception unit 330 executes the process indicated at S200 again.

Figure 22:
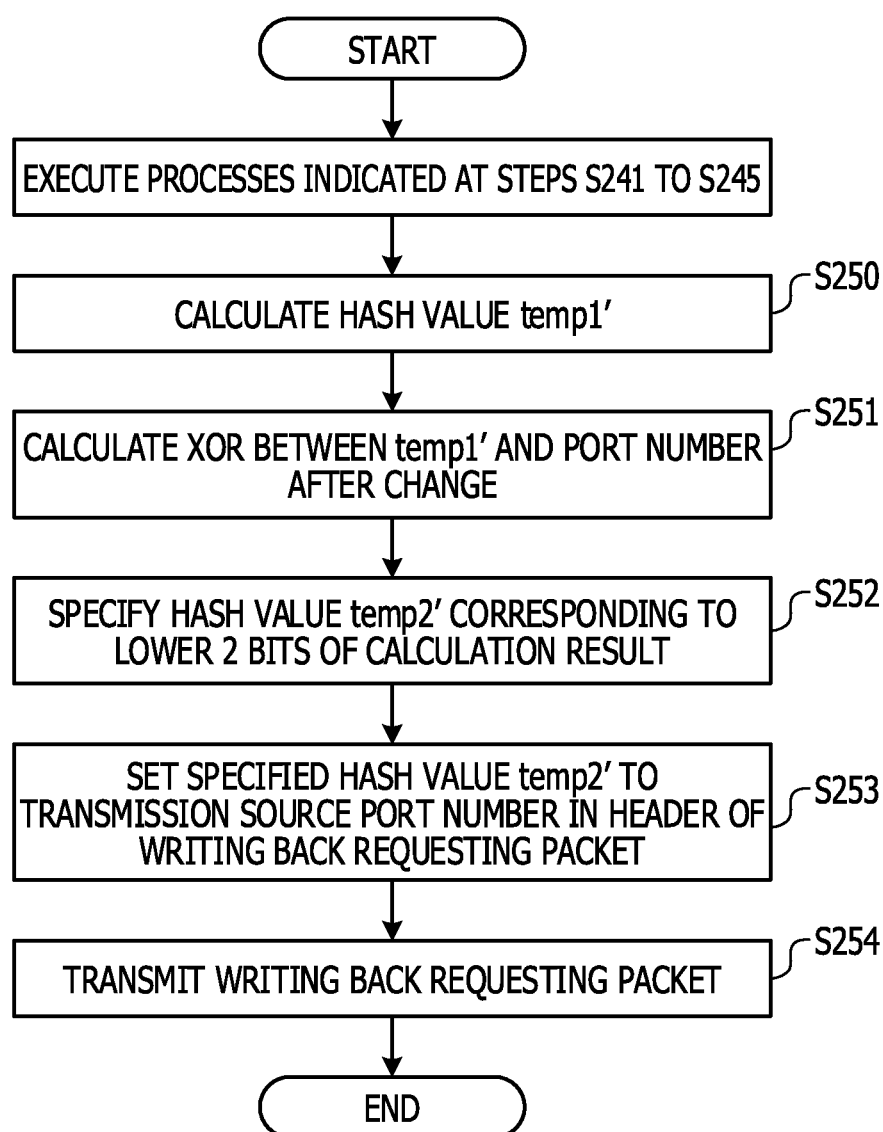
FIG. 22 is a flow chart illustrating an example of a rewriting setting process in the third embodiment.

FIG. 22 is a flow chart illustrating an example of a rewriting setting process in the third embodiment. Except matters described below, the rewriting setting process in the present embodiment is similar to the rewriting setting process in the first embodiment described hereinabove with reference to FIG. 13. Therefore, in the following, description is given principally of differences from the rewriting setting process in the first embodiment.

The switch device 30 executes the processes at S241 to S245 described hereinabove with reference to FIG. 13. Then, the port changing unit 311 transmits the DestPhyPort-Set packet received from the control device 20 and the specified hash value to the writing back request transmission unit 315. The writing back request transmission unit 315 extracts the flow information and address information of the second switch device 30 from the DestPhyPortSet packet received from the port changing unit 311. Then, the writing back request transmission unit 315 specifies a transmission source IP address, a destination IP address, a destination port number and a protocol number to be stored into the header 41 of the writing back requesting packet 40. Then, the writing back request transmission unit 315 transmits the specified transmission source IP address, destination IP address, destination port number and protocol number to the hash calculation unit 335. The hash calculation unit 335 calculates a hash value temp1' using the transmission source IP address, destination IP address, destination port number and protocol number received from the writing back request transmission unit 315 (S250). Then, the hash calculation unit 335 transmits the calculated hash value temp1' to the writing back request transmission unit 315.

Then, the writing back request transmission unit 315 calculates an XOR between the port number of the transmission port 36 after change included in the DestPhyPortSet packet received from the port changing unit 311 and the hash value temp1' received from the hash calculation unit 335 (S251). Then, the writing back request transmission unit 315 refers to the hash table 320 to specify one of a plurality of hash values associated with an index of a value equal to the value of the lower two bits of a result of the XOR calculation as a hash value temp2' (S252). Then, the writing back request transmission unit 315 generates a writing back requesting packet 40 in which the specified hash value temp2' is stored in the transmission source port number (Srt Port) in the header 41 (S253). Then, the writing back request transmission unit 315 transmits the generated writing back requesting packet 40 to the port specification unit 333.

The port specification unit 333 specifies the port number of the transmission port 36 based on the destination MAC address of the writing back requesting packet 40 received from the writing back request transmission unit 315. The hash calculation unit 335 calculates a hash value when port numbers of a plurality of transmission ports 36 are specified by the port specification unit 333. The port selection unit 336 selects one of the transmission ports 36 from which the writing back requesting packet 40 is to be transmitted based on the hash value calculated by the hash calculation unit 335 and stores the writing back requesting packet 40 into the transmission queue 35 coupled to the selected transmission port 36. Consequently, the writing back requesting packet 40 is transmitted from the transmission port 36 selected by the port selection unit 336 (S254).

As described above, the control device 20 in the present embodiment causes the switch device 30 coupled to the communication device 14 of the transmission source of a packet to rewrite the transmission source port number in the header of the packet. Then, the control device 20 in the present embodiment causes the switch device 30 coupled to the communication device 14 of the destination of a packet to rewrite the transmission source port number in the header. Consequently, the communication device 14 at the reception side can receive a packet same as the packet transmitted from the communication device 14 at the transmission side.

The components of the blocks depicted in the figures and described hereinabove are not necessarily configured physically in such a manner as depicted in the figures. In other words, particular forms of disintegration and integration of the blocks are not limited to the forms depicted in the figures, but all or some of them can be functionally or physically disintegrated or integrated in an arbitrary unit in response to various loads, use situations and so forth.

Further, the various processing functions performed by the control device 20 may be executed entirely or at arbitrary part thereof on a central processing unit (CPU) (or a microcomputer such as a micro processing unit (MPU) or a micro controller unit (MCU)). It is a matter of course that the various processing functions may be executed entirely or at arbitrary part thereof on a program that is analyzed and executed by a CPU (or a microcomputer such as an MPU or an MCU) or on hardware by wired logics.

Figure 23:
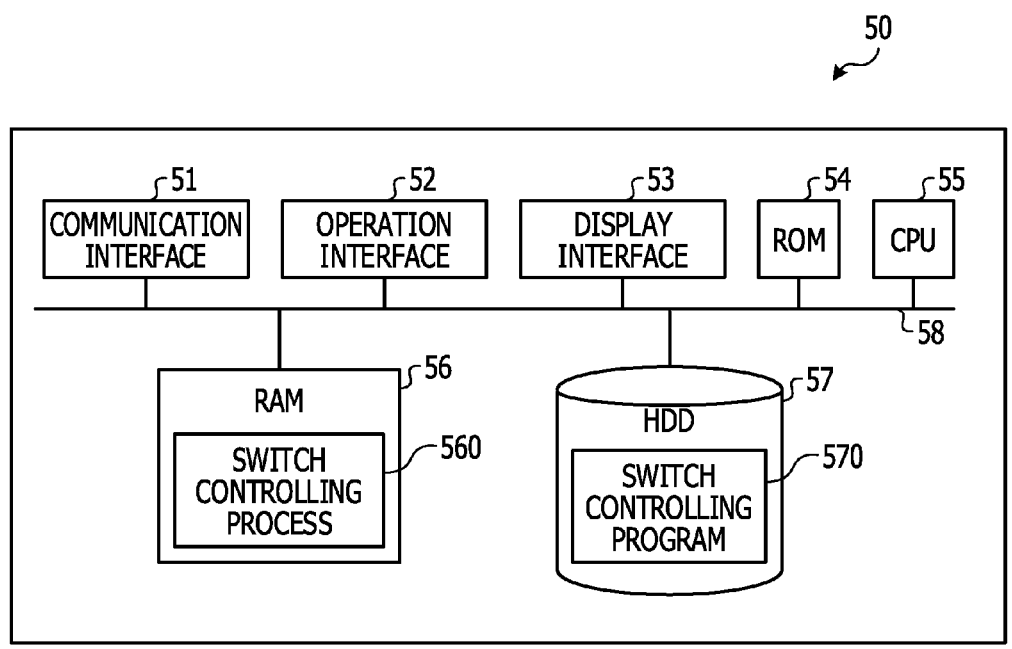
FIG. 23 is a view depicting an example of a computer that implements functions of a control device.

Incidentally, the various processes described hereinabove in connection with the first embodiment can be implemented by execution of a program prepared in advance by the control device 20. Therefore, in the following, an example of a control device that executes a program having functions similar to the functions in the embodiments described hereinabove is described. FIG. 23 is a view depicting an example of a computer that implements functions of the control device. The control device described with reference to FIG. 23 may be the control device 20 depicted in FIG. 1.

As depicted in FIG. 23, a computer 50 includes a communication interface 51, an operation interface 52, a display interface 53, a read only memory (ROM) 54 and a CPU 55. As depicted in FIG. 23, the computer 50 includes a random access memory (RAM) 56 and a hard disk drive (HDD) 57. The communication interface 51, operation interface 52, display interface 53, ROM 54, CPU 55, RAM 56 and HDD 57 are coupled to each other through a bus 58.

The HDD 57 has a switch controlling program 570 stored in advance therein. The CPU 55 reads out the switch controlling program 570 from the HDD 57 and develops the switch controlling program 570 in the RAM 56. The switch controlling program 570 may be suitably integrated or disintegrated similarly to the components described hereinabove with reference to FIG. 3 or 16.

The CPU 55 reads out the switch controlling program 570 from the HDD 57 and develops the switch controlling program 570 as a switch controlling process 560 in the RAM 56. Then, the CPU 55 exhibits, for example, functions similar to the functions of the collection unit 210, changing port specification unit 211 and changing instruction transmission unit 212 by executing the switch controlling process 560 developed in the RAM 56 in the embodiments described hereinabove.

The CPU 55 executes, for example, the process illustrated in FIG. 9 by executing the switch controlling process 560 developed in the RAM 56 in the first embodiment described hereinabove. The CPU 55 executes, for example, the process illustrated in FIG. 15 by executing the switch controlling process 560 developed in the RAM 56 in the second embodiment described hereinabove. The CPU 55 executes, for example, the process illustrated in FIG. 20 by executing the switch controlling process 560 developed in the RAM 56 in the third embodiment described hereinabove.

The processing units implemented virtually by the CPU 55 may not all be implemented always by the CPU 55, but only the processing units that are used for processing may be implemented virtually. The switch controlling program may not necessarily be stored fully in the HDD 57 from the beginning. For example, individual programs may be stored in a portable recording medium such as an integrated circuit (IC) card, which is inserted into the control device 20, such that the control device 20 acquires the programs from the portable recording medium and executes the programs. Alternatively, the control device 20 may acquire programs from a different computer, a server device or the like, in which the programs are stored, through a wireless communication line, a public network, the Internet, a local area network (LAN), a wide area network (WAN) or the like and execute the programs.

In the first embodiment, the header information extraction unit 331 extracts header information of packets received by the packet reception unit 330 every given interval of time or for every given number of packets. In the second embodiment, the header information extraction unit 331 extracts, from a packet whose original packet is used for communication of the connection type, header information of the packet indicative of establishment or release of connection. However, the technology disclosed herein is not limited to them. For example, the header information extraction unit 331 may extract header information of a packet where the encapsulated original packet is a packet that belongs to a particular domain. The header information extraction unit 331 may extract header information of a packet that belongs to an Elephant flow that handles a large amount of data or a Mice flow that handles a small amount of data.

In the third embodiment described hereinabove, the control device 20 causes the switch device 30 coupled to the communication device 14 of the transmission source of a packet to rewrite the transmission source port number in the header of the packet. Then, in the third embodiment described hereinabove, the control device 20 causes the switch device 30 coupled to the communication device 14 of the destination of a packet to write back the transmission source port number in the header. However, the first control device 20 that causes the transmission source port number in the header to be rewritten may not be the switch device 30 coupled to the communication device 14 of the transmission source of a packet. The second control device 20 that causes the transmission source port number in the header to be written back may not be the switch device 30 coupled to the communication device 14 of the destination of the packet. However, the second control device 20 is a control device 20 provided between the first control device 20 and the communication device 14 of the destination of a packet on a transmission path of the packet.

Even when each switch device 30 receives a packet with a header including flow information registered in the rewriting table 321, if the packet is not an encapsulated original packet, then the switch device 30 does not rewrite the transmission source port number in the header of the packet. Consequently, header information of a packet that is not an encapsulated original packet may be prevented from being rewritten.

In the embodiments described hereinabove, each switch device 30 specifies a packet of which a hash value in a header is to be rewritten based on flow information included in a header of a packet encapsulated from an original packet. However, the technology disclosed herein is not limited to this. For example, if the switch device 30 is capable of recognizing a header of an original packet, then the switch device 30 may specify a packet of which a hash value in a header is to be rewritten based on information included in the header of the original packet in addition to the header of the packet encapsulated from the original packet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information process system, comprising:
a switch device including a plurality of ports; and
a control device configured to control the switch device,
wherein the control device is configured to:
specify a flow for which transmission port is to be changed among a plurality of flows, and a changed transmission port after changing the transmission port based on load distribution information and statistics information, the load distribution information being information in which the flow and the transmission port from which a packet belonging to the flow is to be transmitted, are associated with each other for each of the plurality of flows respectively including a series of packets having a common attribute including at least one of a transmission source IP address, a destination IP address, a transmission source port number, a destination port number and a protocol number, the statistics information indicating a use rate of each of the plurality of ports, and
transmit a changing instruction packet, for instructing changing of the transmission port to the switch device, the changing instruction packet including information of the specified flow and information of the specified changed transmission port, and
wherein the switch device is configured to:
receive the changing instruction packet from the control device, and
update a hash value corresponding to the transmission port in header information included in each of the series of packets belonging to the specified flow, to a hash value corresponding to the specified changed transmission port.

2. The information processing system according wherein the control device is configured to:
- specify, from among a plurality of ports allocated to a same aggregation port, a port whose use rate is equal to or higher than a given value as the transmission port to be changed; and
- specify a port whose use rate is lower than the given value as the transmission port after the change.

3. The information processing system according to claim 1, wherein the series of packets is a packet group in which a transmission source IP address, a destination IP address, a transmission source port number, a destination port number and a protocol number are common.

4. The information processing system according to claim 1,
- wherein the switch device is configured to transmit first port information corresponding to first flow information to the control device, when an inquiry packet, which includes the first flow information, for inquiring about a transmission port corresponding to the first flow information is received from the control device, and
- wherein the control device is configured to update the load distribution information by storing the first flow information and the first port information in an associated relationship with each other, when the first port information is received from the switch device.

5. The information processing system according to claim 4, wherein the switch device is configured to extract the header information from each of the series of packets every given interval of time.

6. The information processing system according to claim 4, wherein the switch device is configured to determine whether the header information is to be extracted from each of the series of packets, based on an attribute of an original packet included in the each of the series of packets.

7. The information processing system according to claim 4, wherein
- the header information includes a hash value calculated from an original packet, and
- the switch device is configured to update the hash value in the header information of each of the series of packets included in the flow specified by the flow information in the changing instruction packet to a hash value with which a port corresponding to port information in the changing instruction packet is selected, when the changing instruction packet is received.

8. The information processing system according to claim 1, wherein the switch device is configured to receive a packet encapsulated from an original packet and including header information.

9. The information processing system according to claim 1, wherein the switch device is a first switch device, further comprising a second switch device coupled to the first switch device through the plurality of ports,
- wherein the load distribution information includes information of a hash value before updating for each of the plurality of flows,
- wherein the control device is configured to
  - transmit the changing instruction packet that further includes identification information of the second switch device and the information of the hash value before updating to the first switch device,
- wherein the first switch device is configured to
  - transmit a writing back requesting packet for requesting to restore an original hash value to the second switch device corresponding to the identification information included in the changing instruction packet, the writing back requesting packet including information of a flow to which a packet including the header information including the updated hash value belongs and information of the hash value before updating, and
- wherein the second switch device is configured to:
  - receive a plurality of packets and the writing back requesting packet; and
  - change the updated hash value included in the header information of that one of the plurality of received packets, which belongs to the flow corresponding to the flow information included in the received writing back requesting packet, to the hash value before updating.

10. A control device configured to control a switch device including a plurality of ports, the control device comprising:
- a memory; and
- a processor coupled to the memory and configured to:
  - specify a flow for which transmission port is to be changed among a plurality of flows, and a changed transmission port after changing the transmission port based on load distribution information and statistics information, the load distribution information being information in which the flow and the transmission port from which a packet belonging to the flow is to be transmitted, are associated with each other for each of the plurality of flows respectively including a series of packets having a common attribute including at least one of a transmission source IP address, a destination IP address, a transmission source port number, a destination port number and a protocol number, the statistics information indicating a use rate of each of the plurality of ports, and
  - transmit a changing instruction packet for instructing changing of the transmission port to the switch device, the changing instruction packet including information of the specified flow and information of the specified changed transmission port so that the switch device updates a hash value corresponding to the transmission port in header information included in each of the series of packets belonging to the specified flow, to a hash value corresponding to the specified changed transmission port.

11. A control method executed by an information processing system that includes a switch device including a plurality of ports and a control device configured to control the switch device, the control method comprising:
- specifying, by a first processor included in the control device, a flow for which transmission port is to be changed among a plurality of flows and a changed transmission port after changing based on load distribution information and statistics information, the load distribution information being information in which the flow and the transmission port from which a packet belonging to the flow is to be transmitted are associated with each other for each of the plurality of flows respectively including a series of packets having a common attribute including at least one of a transmission source IP address, a destination IP address, a transmission source port number, a destination port number and a protocol number, the statistics information indicating a use rate of each of the plurality of ports;
- transmitting a changing instruction packet for instructing changing of the transmission port to the switch device, the changing instruction packet including information of the specified flow and the specified changed transmission port;

receiving, by a second processor included in the switch device, the changing instruction packet from the control device; and updating a hash value corresponding to the transmission port in header information included in each of the series of packets belonging to the specified flow, to a hash value corresponding to the specified changed transmission port.

* * * * *